(12) United States Patent
Patel et al.

(10) Patent No.: US 11,673,250 B2
(45) Date of Patent: Jun. 13, 2023

(54) BIDIRECTIONAL AIR INLET VALVE ASSEMBLY

(71) Applicant: BLACK & DECKER INC., New Britain, CT (US)

(72) Inventors: Sandipkumar D. Patel, Rosedale, MD (US); Ross A. Billings, Reistertown, MD (US); Andrew J. Birkel, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 45 days.

(21) Appl. No.: 17/112,348

(22) Filed: Dec. 4, 2020

(65) Prior Publication Data

US 2021/0187720 A1 Jun. 24, 2021

Related U.S. Application Data

(63) Continuation of application No. 16/725,162, filed on Dec. 23, 2019, now abandoned, which is a continuation of application No. 15/603,109, filed on May 23, 2017, now Pat. No. 10,513,025.

(51) Int. Cl.
*B25F 5/00* (2006.01)
*B25D 9/08* (2006.01)
*B23Q 5/06* (2006.01)
*B25B 21/00* (2006.01)

(52) U.S. Cl.
CPC ............... *B25F 5/005* (2013.01); *B23Q 5/06* (2013.01); *B25B 21/00* (2013.01); *B25D 9/08* (2013.01); *B25F 5/00* (2013.01)

(58) Field of Classification Search
CPC .. B25F 5/00; B25B 21/00; B23Q 5/06; B25D 9/08
USPC ........................................................ 173/169
See application file for complete search history.

(56) References Cited

U.S. PATENT DOCUMENTS 6,883,619 B1 * 4/2005 Huang .................... B25B 21/02
173/168
10,513,025 B2 * 12/2019 Patel ....................... B25D 9/08

* cited by examiner

*Primary Examiner* — Nathaniel C Chukwurah
(74) *Attorney, Agent, or Firm* — Caeden Drayton

(57) ABSTRACT

In an improved air inlet valve assembly, a flow of air along a first or second flow path may be controlled by a position of air inlet guide surfaces of a rotatable valve relative to air inlet guide slots of a fixed valve sleeve. Air flowing along the first flow path may rotate a motor in a first direction to operate the tool in a forward mode. Air flowing along the second flow path may rotate the motor in the second direction to operate the tool in a reverse mode. In the forward mode, as air flows along the first flow path, air may be discharged along a primary discharge path, with a portion of the second flow path providing a secondary discharge path. In the reverse mode, as air flows along the second flow path, air may be discharged along the primary discharge path, with a portion of the first flow path providing the secondary discharge path.

2 Claims, 21 Drawing Sheets

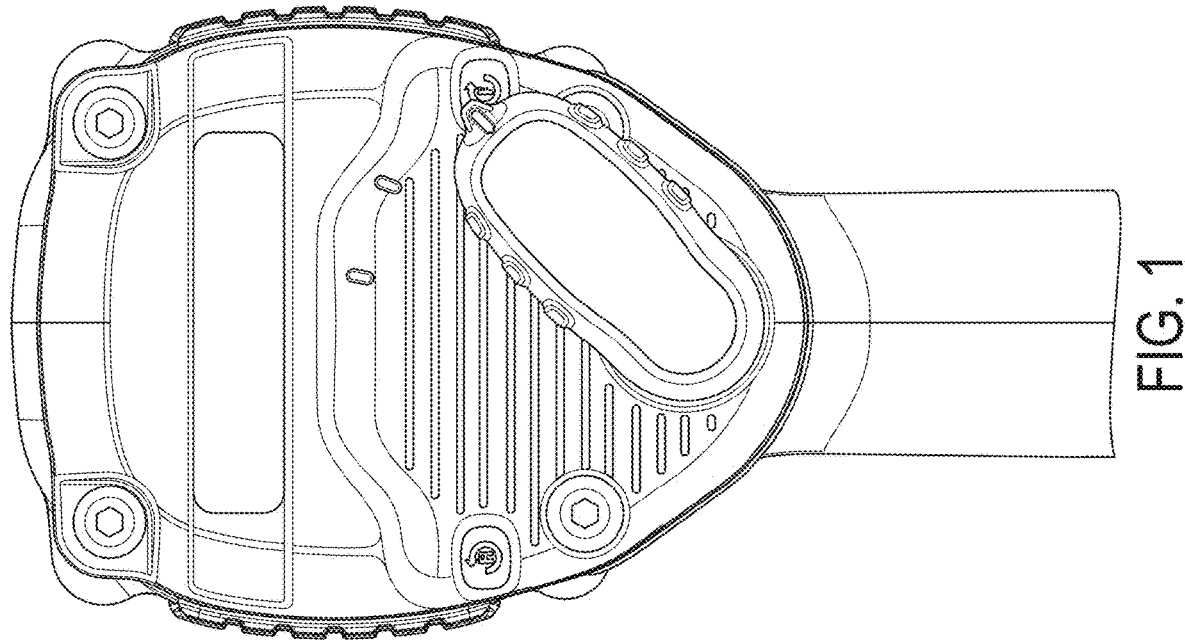

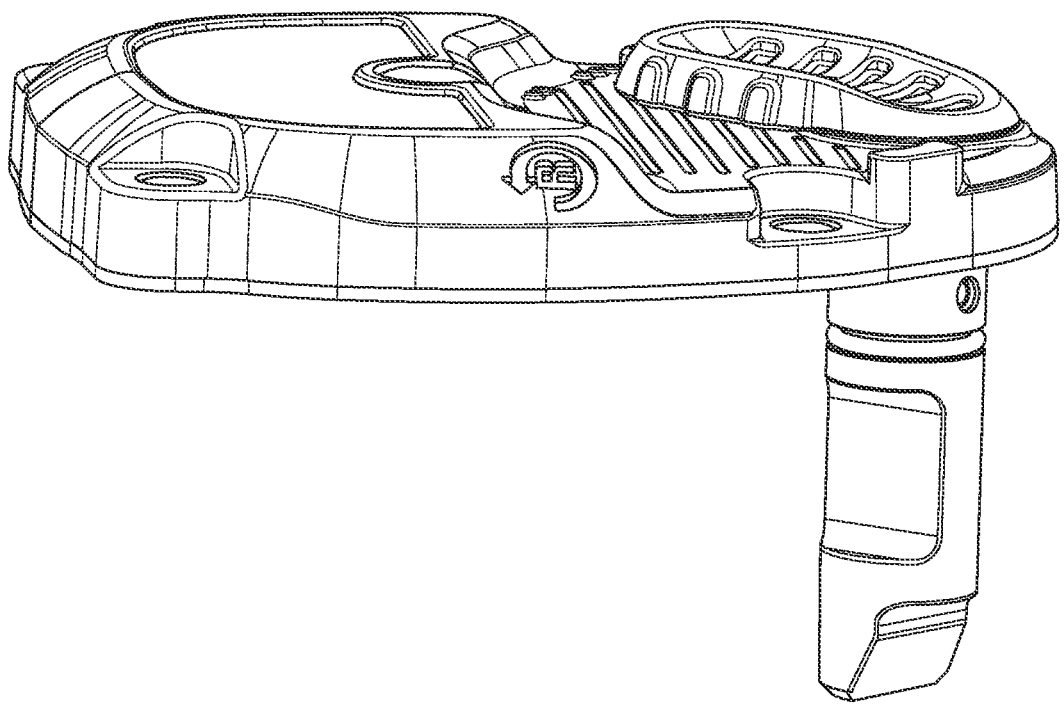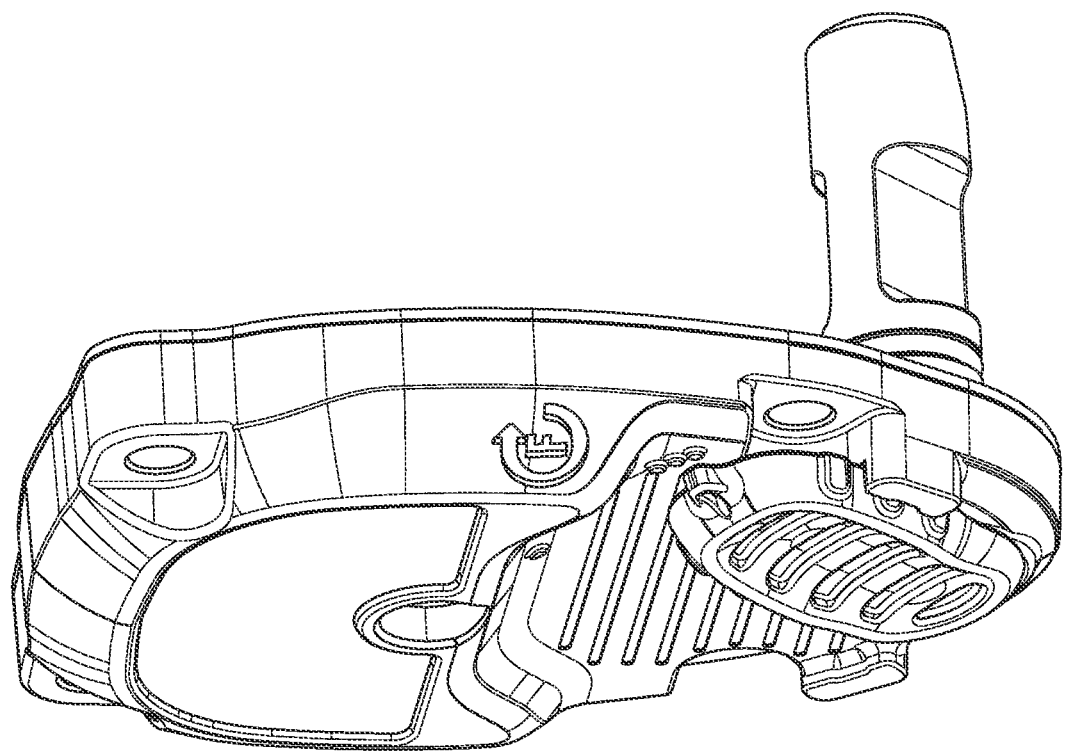
Fig 2A

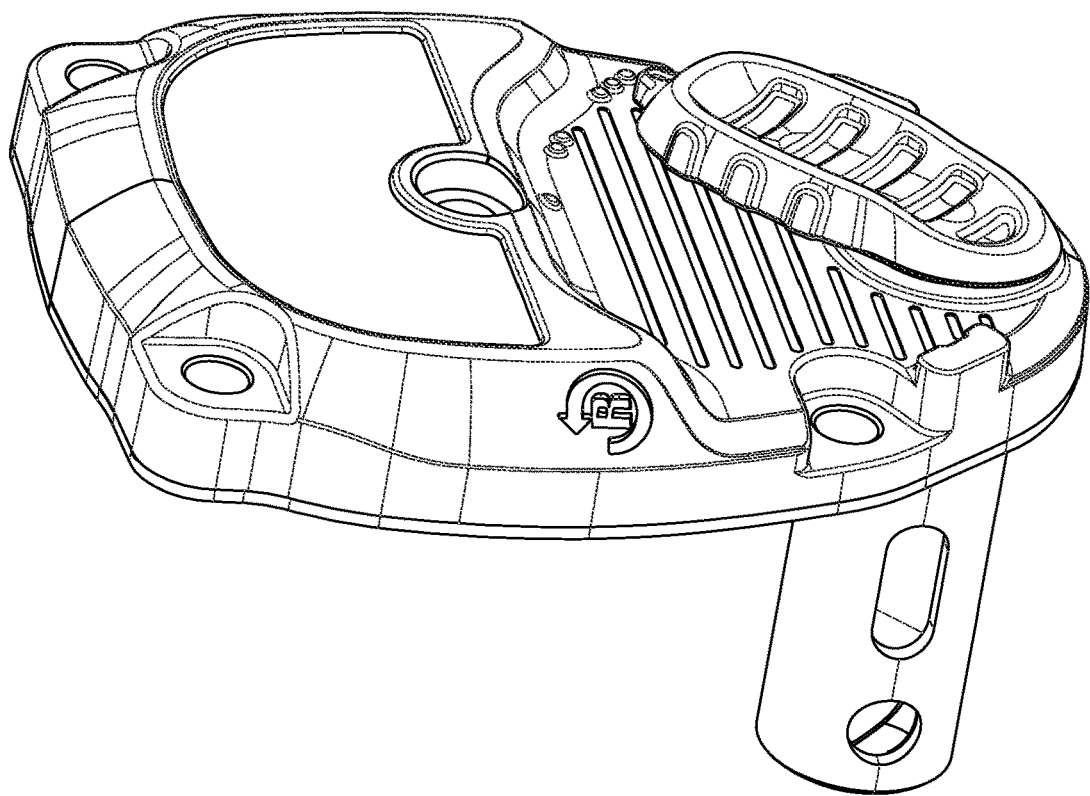
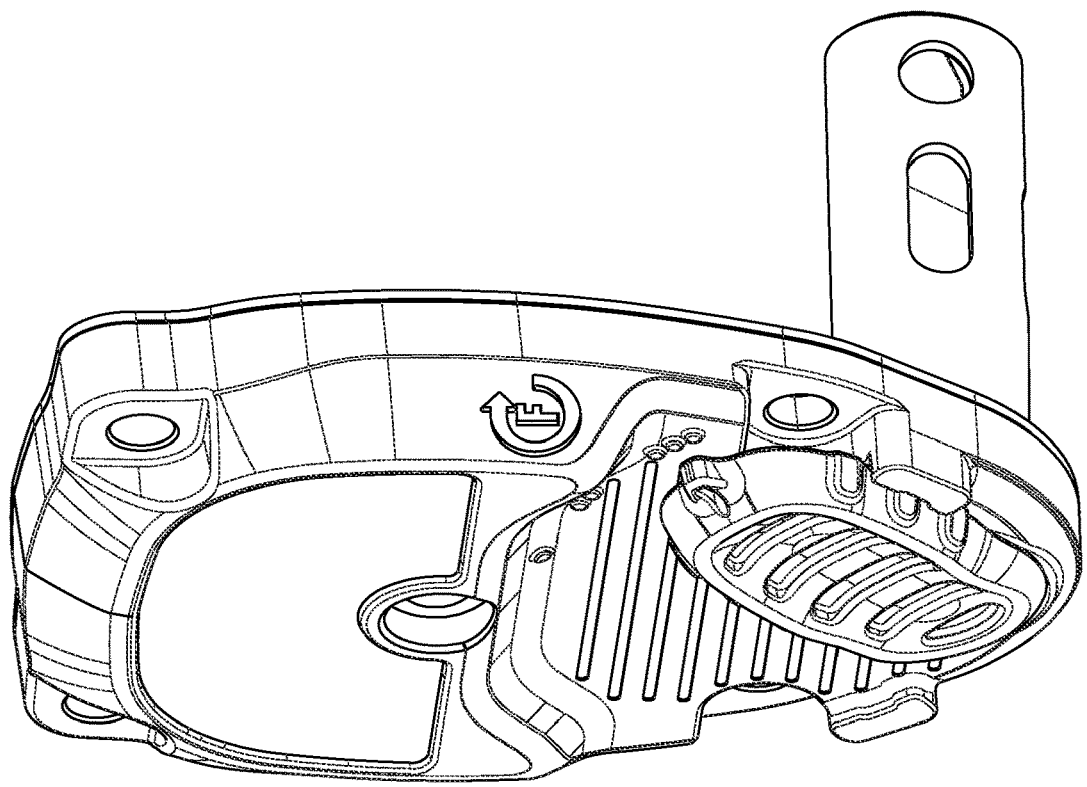
Fig 2B

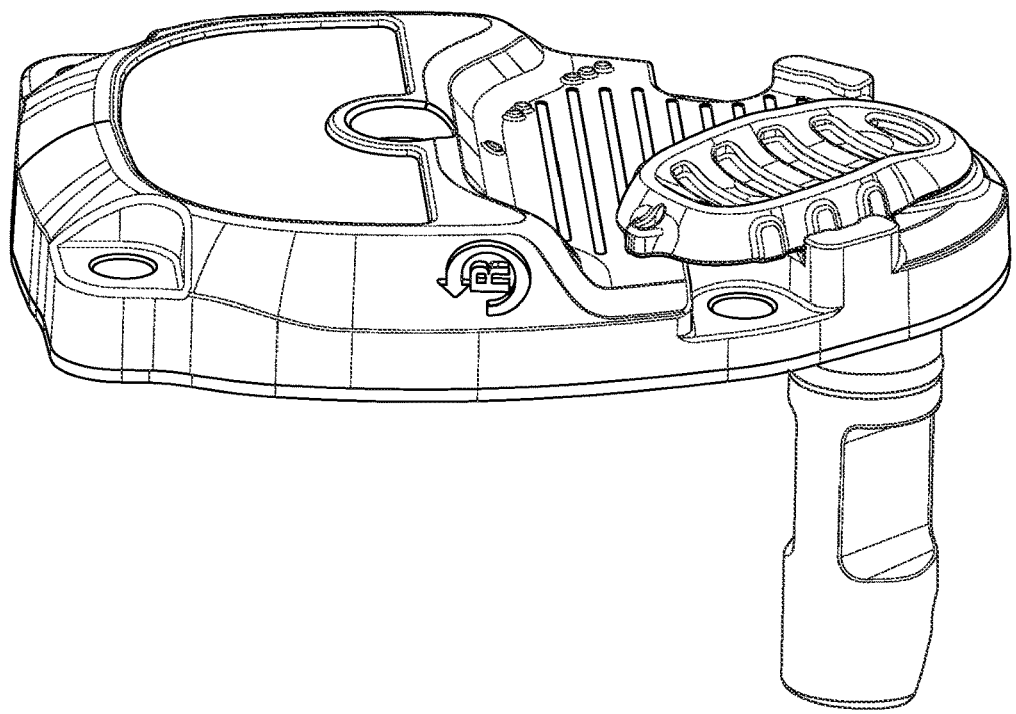
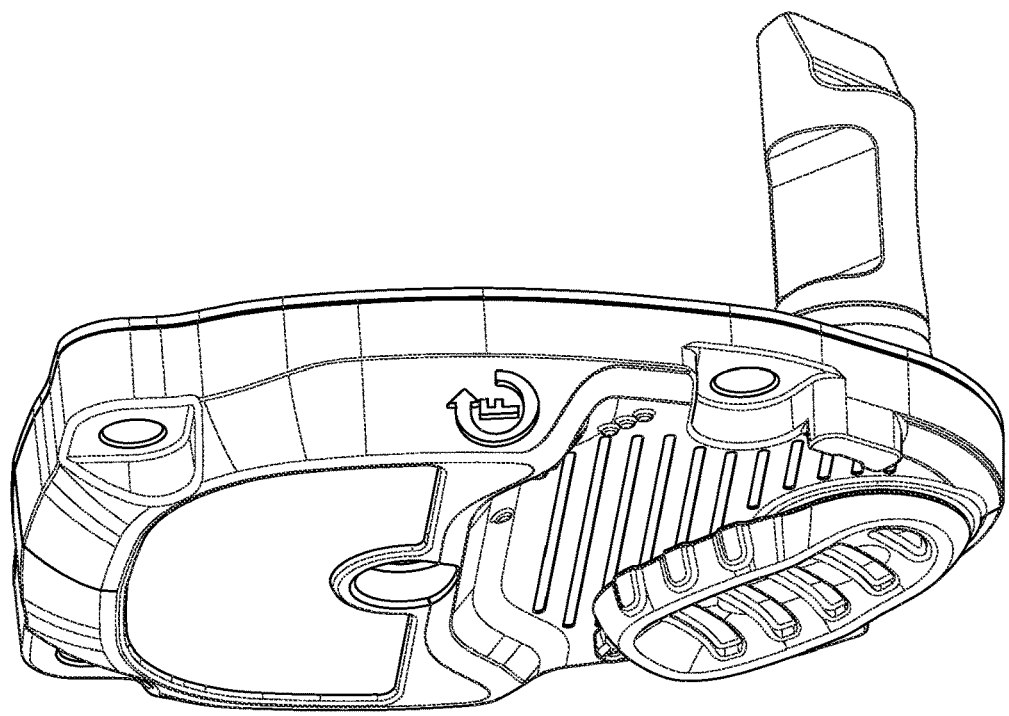
Fig 3A

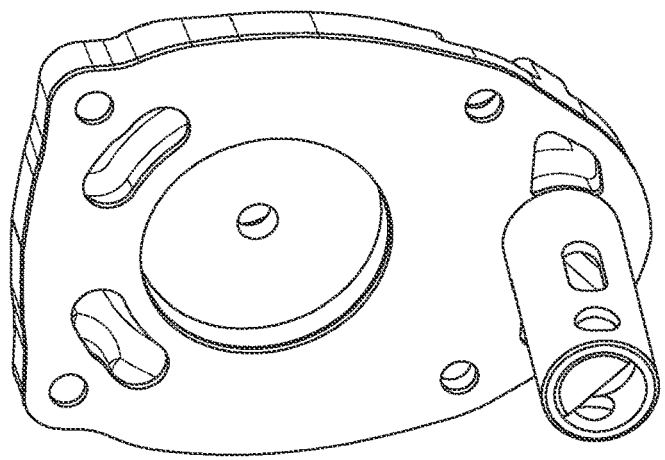
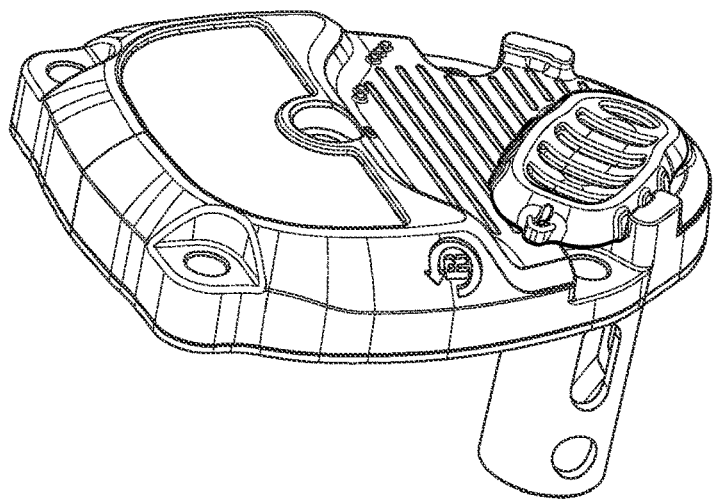
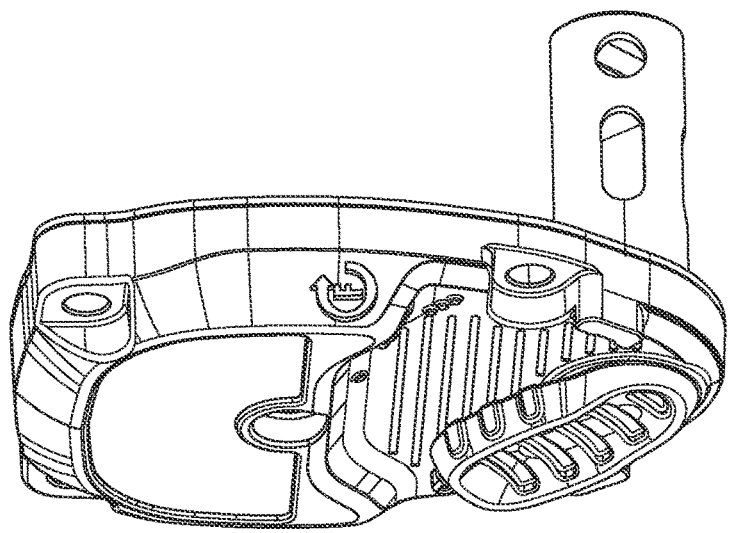
Fig 3B

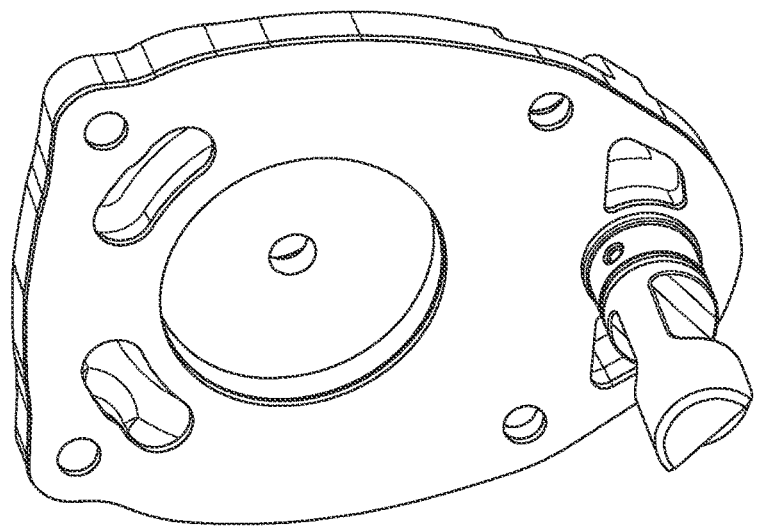
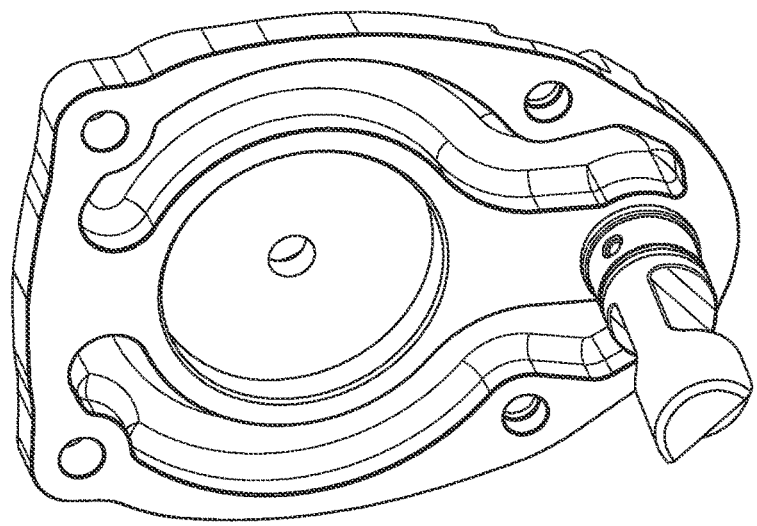
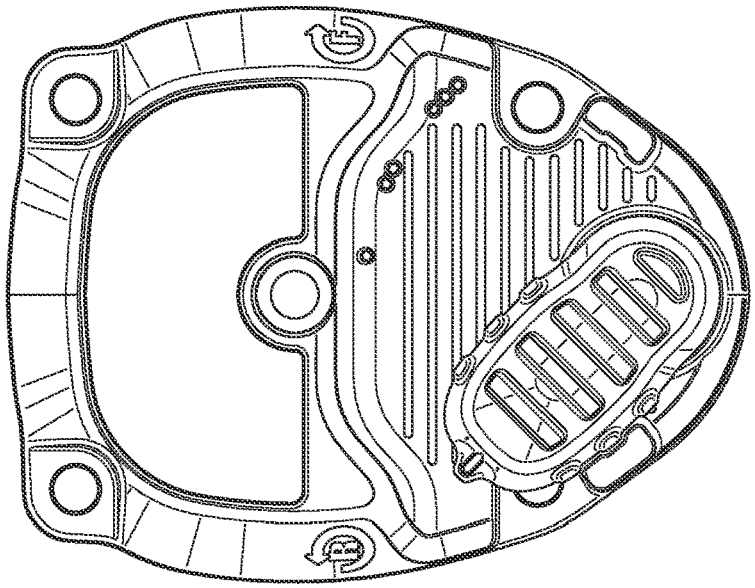
Fig 4

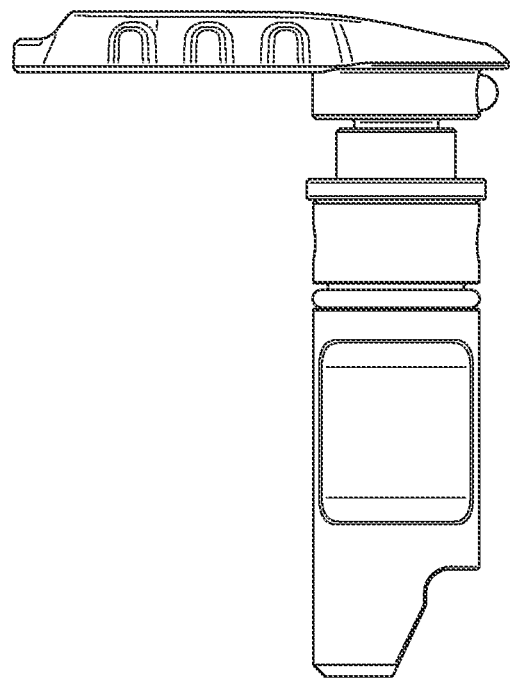
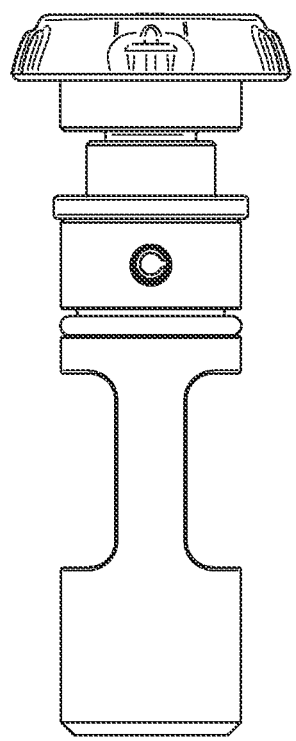
Fig 5

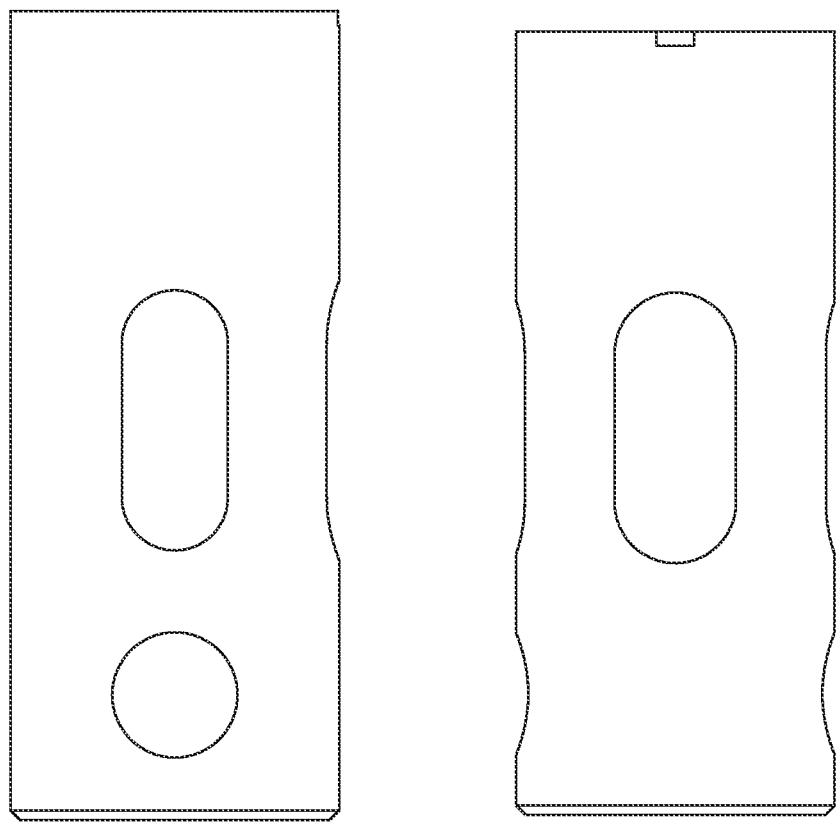
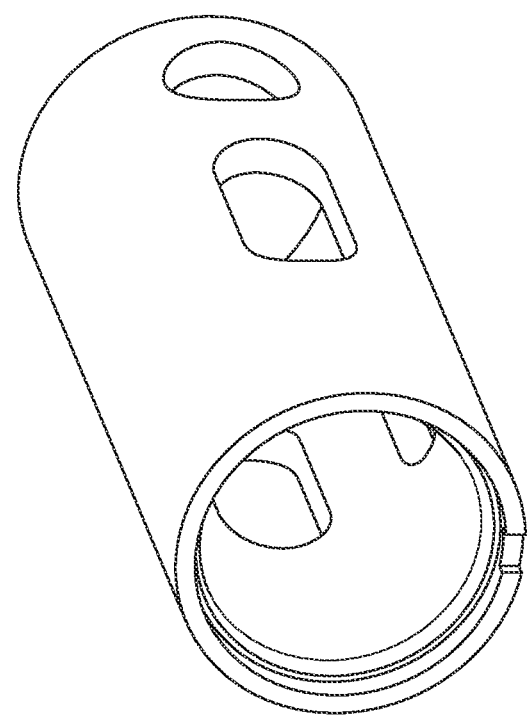
Fig 6

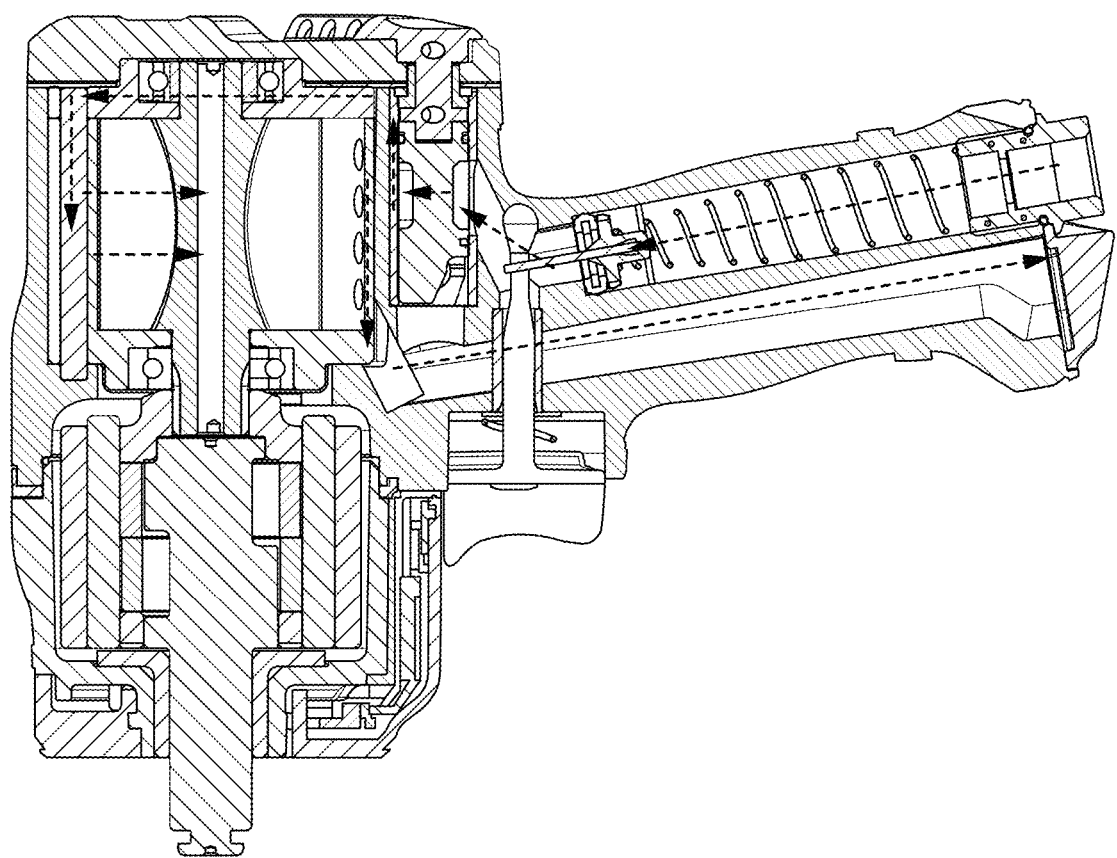

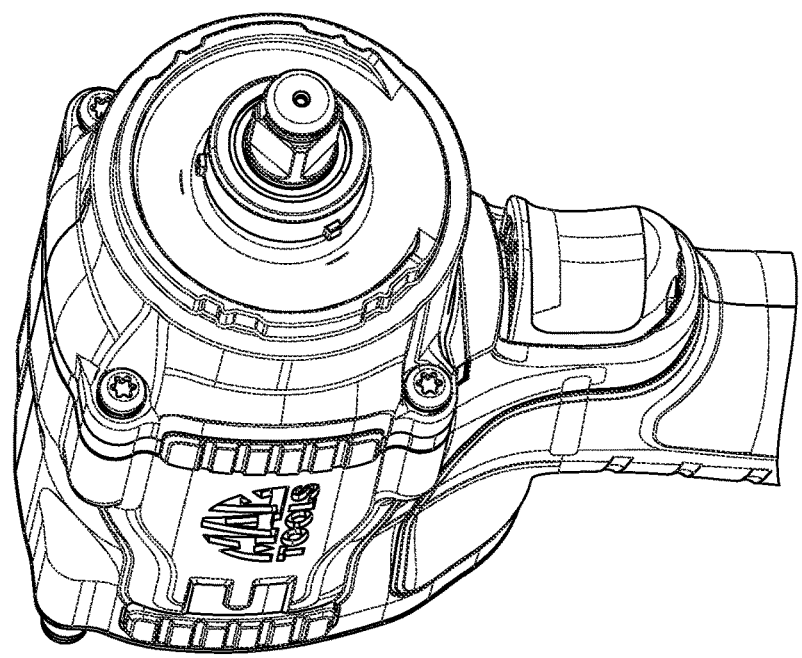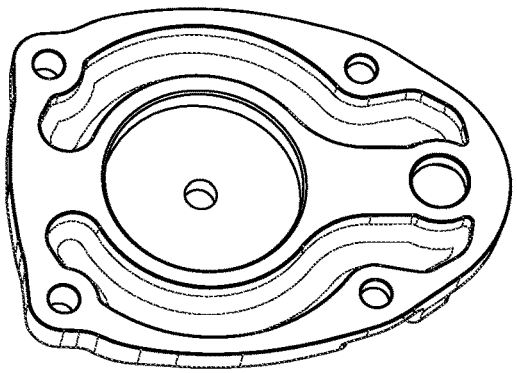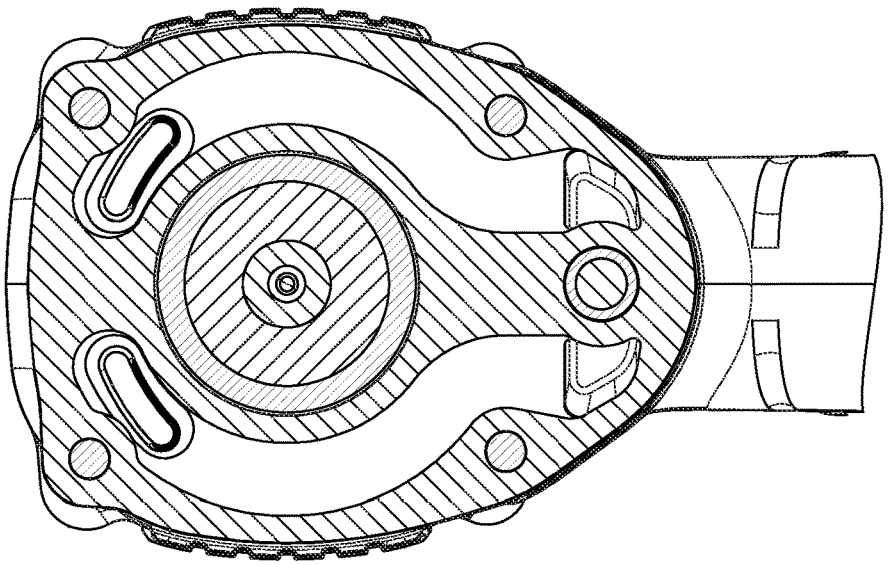
Fig 10E

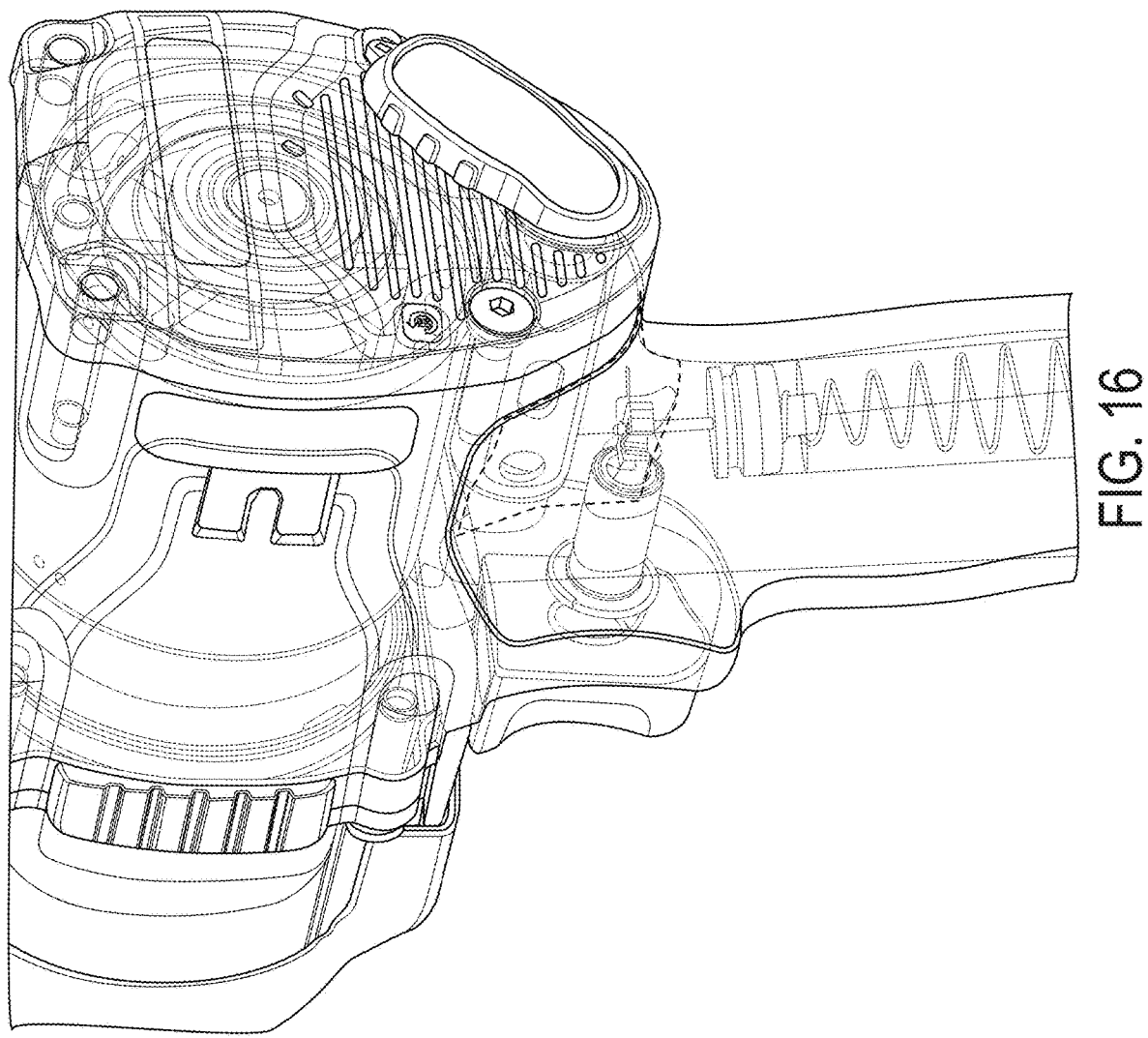

BIDIRECTIONAL AIR INLET VALVE ASSEMBLY

RELATED APPLICATIONS

This application is a continuation of U.S. patent application Ser. No. 16/725,162, which is a continuation of U.S. patent application Ser. No. 15/603,109, filed May 23, 2017, now U.S. Pat. No. 10,513,025, issued Dec. 24, 2019.

FIELD

This document relates, generally, to air valves, and in particular, to an improved bidirectional air inlet valve assembly for pneumatic tools.

BACKGROUND

Powered tools, and in particular, pneumatic tools, may be driven by compressed air provided by a compressed air source. An operation mode of the pneumatic tool, such as, for example, operation in a forward mode or a reverse mode, may be controlled by a direction of the flow of compressed air through the pneumatic tool. Efficient and effective control of the flow of the compressed air through the pneumatic tool may enhance performance of the tool, and may simplify use of the tool.

SUMMARY

In one aspect, a bidirectional air inlet valve assembly, comprising an inlet valve, where in the air inlet vale sleeve has an angled surface to control air flow, an inlet valve sleeve, wherein the inlet valve has a plurality of different size apertures configured for directing air flow, and wherein the inlet valve sleeve includes, a main inlet slot defined in a bottom portion of the valve sleeve, a first inlet guide slot defined in a first side of the valve sleeve, a second inlet guide slot defined in a second side of the valve sleeve, a first discharge guide opening defined in the first side of the valve sleeve, and a second discharge guide opening defined in the second side of the valve sleeve, and a back cap, wherein the back cap has a plurality of air inlet ports adapted to receive air flow, a valve rotatably received in the valve sleeve, the valve including a valve body, a first inlet guide surface defined in a first side of the valve body, a second inlet guide surface defined in a second side of the valve body, and a discharge guide surface defined by a chamfer at a distal end portion of the valve body, and, a motor sleeve, wherein in the motor sleeve has a plurality of motor inlet ports configured to receive air flow, and wherein the motor sleeve has a plurality of exhaust channels adapted to control air flow.

In one aspect, an improved air inlet valve assembly selectively providing compressed air to a motor, the motor may include a rotor rotatably coupled in a rotor chamber installed in a housing of a tool. The valve assembly may include a valve sleeve received in the housing, and a valve rotatably received in the valve sleeve. The valve sleeve may include a main inlet slot defined in a bottom portion of the valve sleeve, a first inlet guide slot defined in a first side of the valve sleeve, a second inlet guide slot defined in a second side of the valve sleeve, a first discharge guide opening defined in the first side of the valve sleeve, and a second discharge guide opening defined in the second side of the valve sleeve. The valve may include a valve body, a first inlet guide surface defined in a first side of the valve body, a second inlet guide surface defined in a second side of the valve body, and a discharge guide surface defined by a chamfer at a distal end portion of the valve body.

In another aspect, there is a method of improving air flow in a tool, comprising controlling air through an inlet valve, wherein the inlet valve is adapted to allow air flow based on position of the inlet valve, directing air through an inlet valve sleeve, wherein the air is directed through a plurality of apertures in the inlet valve sleeve, directing air into a motor, where in the motor includes a plurality of vanes configured for turning in a direction, channeling air through a plurality of apertures in a motor sleeve surrounding the motor, a back cap, wherein the back cap is configured to move air flow in connection with the motor and to an exhaust channel of the inlet valve, and when applicable, directing remaining air in the motor through a second exhaust channel back to the inlet valve.

In some implementations, the first inlet guide slot is defined in a first side of an intermediate portion of the valve sleeve, the second inlet guide slot is defined in a second side of the intermediate portion of the valve sleeve, the first discharge guide opening is defined in a first side of a distal end portion of the valve sleeve, the second discharge guide opening is defined in a second side of the distal end portion of the valve sleeve, and the main inlet is defined in the bottom portion of the valve sleeve, at a position corresponding to the first discharge guide opening and the second discharge guide opening. In some implementations, the second side of the intermediate portion of the valve sleeve is opposite the first side of the intermediate portion of the valve sleeve. In some implementations, the first inlet guide surface includes a flat transverse surface defined in a first side of an intermediate portion of the valve body, and the second inlet guide surface includes a flat transverse surface defined in a second side of the intermediate portion of the valve body. In some implementations, the second side of the intermediate portion of the valve body is opposite the first side of the intermediate portion of the valve sleeve. In some implementations, with the valve received in the valve sleeve, a position of the first inlet guide surface of the valve corresponds to a position of the first inlet guide slot of the valve sleeve, a position of the second inlet guide surface of the valve corresponds to a position of the second inlet guide slot of the valve sleeve, and a position of the discharge guide surface of the valve corresponds to a position of the first discharge guide opening and the second discharge guide opening of the valve sleeve.

In some implementations, the assembly may also include a first rotor cap coupled to a first end portion of the rotor sleeve, a second rotor cap coupled to a second end portion of the rotor sleeve, the rotor sleeve, the first end cap and the second end cap defining a chamber in which the rotor is rotatably received, and a first air passage and a second air passage formed in the first rotor cap. In some implementations, the tool may include a first air channel defined in an end portion of the housing, extending between a first inlet and a first outlet formed in an interior facing side of the end portion of the housing, and a second air channel defined in the end portion of the housing, extending between a second inlet and a second outlet formed in the interior facing side of the end portion of the housing.

In some implementations, in a first position of the valve, the first inlet guide surface is aligned with the first inlet guide slot, so as to guide air from the valve through the first inlet guide slot, into the first air channel through the first inlet, and into the chamber through the first air passage, to rotate the rotor in a first direction, and the second inlet guide slot is blocked by a corresponding portion of the valve body.

In some implementations, in the first position of the valve, the first discharge guide opening is blocked by a corresponding portion of the valve body, and the discharge guide surface is aligned with the second discharge guide opening, so as to guide air, discharged from the chamber through the second air passage and the second air channel, from the valve into a main discharge channel.

In some implementations, in a second position of the valve, the second inlet guide surface is aligned with the second inlet guide slot, so as to guide air from the valve through the second inlet guide slot, into the second air channel through the second inlet, and into the chamber through the second air passage, to rotate the rotor in a second direction, and the first inlet guide slot is blocked by a corresponding portion of the valve body. In some implementations, in the second position of the valve, the second discharge guide opening is blocked by a corresponding portion of the valve body, and the discharge guide surface is aligned with the first discharge guide opening, so as to guide air, discharged from the chamber through the first air passage and the first air channel, from the valve into a main discharge channel.

In some implementations, an area of the first inlet guide slot is greater than an area of the first discharge guide opening, an area of the first inlet guide slot is greater than an area of the second discharge guide opening, an area of the second inlet guide slot is greater than an area of the second discharge guide opening, and an area of the second inlet guide slot is greater than an area of the first discharge guide opening.

In another aspect, a valve assembly of a pneumatic-powered tool may include a motor including a rotor rotatably coupled in a rotor chamber installed in a housing, a compressed air inlet and an air discharge outlet formed in the housing, a first air flow path defined in the housing, the first air flow path guiding compressed air to the rotor chamber to rotate the rotor in a first direction, a second air flow path defined in the housing, the second air flow path guiding compressed air to the rotor chamber to rotate the rotor in a second direction, and a valve assembly selectively controlling a supply of compressed air from the compressed air inlet to the first air flow path or the second air flow path. The valve assembly may include a valve sleeve installed in the housing, and a valve body rotatably received in the valve sleeve. In a first position of the valve body relative to the valve sleeve, a first inlet guide surface defined in a first side of the valve body is aligned with a first inlet guide slot defined in a first side of the valve sleeve so as to guide compressed air out of the valve assembly through the first inlet guide slot and into the first air flow path, and a second inlet guide slot defined in a second side of the valve sleeve is blocked by a corresponding portion of the valve body. In a second position of the valve body relative to the valve sleeve, a second inlet guide surface defined in a second side of the valve body is aligned with the second inlet guide slot defined in the second side of the valve sleeve so as to guide compressed air out of the valve assembly through the second inlet guide slot and into the second air flow path, and the first inlet guide slot defined in the first side of the valve sleeve is blocked by a corresponding portion of the valve body.

In some implementations, in the first position of the valve body relative to the valve sleeve, a first discharge guide opening defined in the first side of the valve sleeve is blocked by a corresponding portion of the valve body, and a discharge guide surface defined by a chamfered surface at a distal end portion of the valve body is aligned with a second discharge guide opening defined in the second side of the valve sleeve, so as to guide residual air, discharged from the chamber, into a main discharge channel, and in the second position of the valve body relative to the valve sleeve, a second discharge guide opening defined in the second side of the valve sleeve is blocked by a corresponding portion of the valve body, and the discharge guide surface is aligned with a first discharge guide opening defined in the first side of the valve sleeve, so as to guide residual air, discharged from the chamber, into the main discharge channel.

In some implementations, the first inlet guide surface includes a flat transverse surface defined in a first side of an intermediate portion of the valve body, and the second inlet guide surface includes a flat transverse surface defined in a second side of the intermediate portion of the valve body, opposite the first side thereof. In some implementations, the valve body is symmetric with respect to a vertical plane defined by a longitudinal axis of the valve body, and the valve sleeve is symmetric with respect to a vertical plane defined by a longitudinal axis of the valve sleeve.

In some implementations, the first flow path includes a primary discharge path and a secondary discharge path, wherein the primary discharge path is defined by a plurality of primary air discharge openings formed in a wall of the chamber, the plurality of primary air discharge openings guiding air from the chamber into a main discharge channel for discharge from the housing through the air discharge outlet, and the secondary discharge path guides residual air from an upper portion of the chamber, through a secondary discharge channel formed in the housing, into the valve, wherein the discharge guide surface guides the residual air from the valve into the main discharge channel through the second discharge opening in in the valve sleeve. In some implementation, the second flow path includes a primary discharge path and a secondary discharge path, wherein the primary discharge path is defined by a plurality of primary air discharge openings formed in a wall of the chamber, the plurality of primary air discharge openings guiding air from the chamber into a main discharge channel for discharge from the housing through the air discharge outlet, and the secondary discharge path guides residual air from an upper portion of the chamber, through a secondary discharge channel formed in the housing, into the valve, where the discharge guide surface of the valve body guides the residual air from the valve into the main discharge channel through the first discharge opening in in the valve sleeve.

In some implementations, an area of the first inlet guide slot is greater than an area of the first discharge guide opening, an area of the first inlet guide slot is greater than an area of the second discharge guide opening, an area of the second inlet guide slot is greater than an area of the second discharge guide opening, and an area of the second inlet guide slot is greater than an area of the first discharge guide opening.

Another object or advantage to this improved bidirectional air inlet valve assembly capability of the tool having an improved inlet surface that includes dedicated features for increased air inlet and exhaust. These improved features can increase the torque and/or power of a tool without changing inlet attachments or changing to a different tool.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein, "connected" or "attached" includes physical or electrical, whether direct or indirect, affixed or adjustably mounted. Thus, unless specified, "connected" or "attached" is intended to embrace any operationally functional connection.

As used herein, "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and approaching or approximating such a physical or functional characteristic.

In the following description, reference is made to the accompanying description and drawings which are provided for descriptive and illustration purposes as representative of specific exemplary embodiments in which the invention may be practiced. Given the following description of the specification and drawings, the apparatus, methods, and systems should become evident to a person of ordinary skill in the art. Further areas of applicability of the present teachings will become apparent from the description and illustrations provided herein. It is to be understood that other embodiments can be utilized and that structural changes based on presently known structural and/or functional equivalents can be made without departing from the scope of the invention.

The details of one or more implementations are set forth in the accompanying drawings and the description below. Other features will be apparent from the description and drawings, and from the claims.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein:

FIG. 1 is a rear perspective view of an exemplary pneumatic-powered tool having a bidirectional air inlet valve assembly, in accordance with implementations described herein.

FIGS. 2A-2B illustrate an exemplary valve of the exemplary pneumatic-powered tool of FIG. 1 in a forward operating position, in accordance with implementations described herein.

FIGS. 3A-3B illustrate an exemplary valve sleeve of the bidirectional air inlet valve assembly of FIG. 1 in a reverse operating position, in accordance with implementations described herein.

FIG. 4 illustrates an exemplary valve with back cap assembly of the bidirectional air inlet valve assembly tool of FIG. 1, in a neutral operating position, in accordance with implementations described herein.

FIG. 5 illustrates an exemplary air inlet valve of the bidirectional air inlet valve assembly of FIG. 1, in accordance with implementations described herein.

FIG. 6 illustrates an exemplary air inlet valve sleeve of the bidirectional air inlet valve assembly of FIG. 1, in accordance with implementations described herein.

FIG. 7 illustrates a left perspective view of the back cap assembly and air inlet valve as shown in FIGS. 1-6 detached from the exemplary pneumatic-powered tool, in accordance with implementations described herein.

FIGS. 10A-10F illustrate a forward air flow path and a secondary exhaust air flow path of the bidirectional air inlet valve assembly through an exemplary pneumatic-powered tool, in accordance with implementations described herein.

FIG. 16 illustrates an interior view of the exemplary pneumatic-powered tool with the bidirectional air inlet valve assembly, in accordance with implementations described herein.

Corresponding reference characters indicate corresponding parts throughout the several views. The exemplifications set out herein illustrate embodiments of the present invention, and such exemplifications are not to be construed as limiting the scope of the present invention in any manner.

These and other features of the invention will become apparent upon review of the following description of the presently preferred embodiments of the invention, taken into conjunction with the figures.

DESCRIPTION

A description of apparatuses, methods, and systems, consistent with embodiments of the present disclosure is provided. While several embodiments are described, it should be understood that the disclosure is not limited to any one embodiment, but instead encompasses numerous alternatives, modifications, and equivalents. In addition, while numerous specific details are set in order to provide a thorough understanding of the embodiments disclosed herein, some embodiments can be practiced without some or all of these details or determined from the drawings. Moreover, for the purpose of clarity, certain technical material that is known in the related art has not been described in detail in order to avoid unnecessarily obscuring the disclosure.

Figure 7:
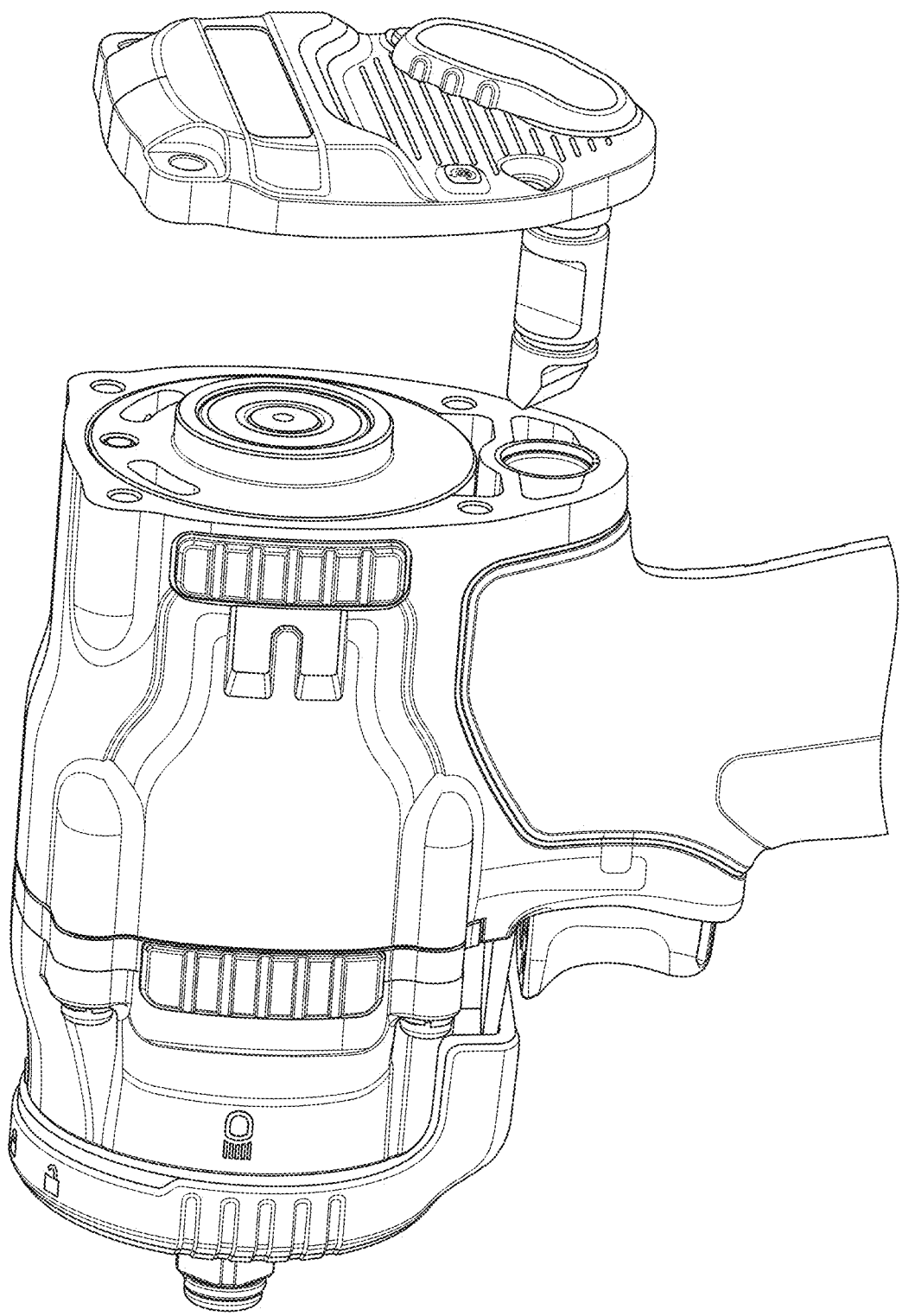
FIG. 7 illustrates a back cap assembly and air inlet valve as shown in FIGS. 1-6 detached from an exemplary pneumatic-powered tool, in accordance with implementations described herein.
Figure 8:
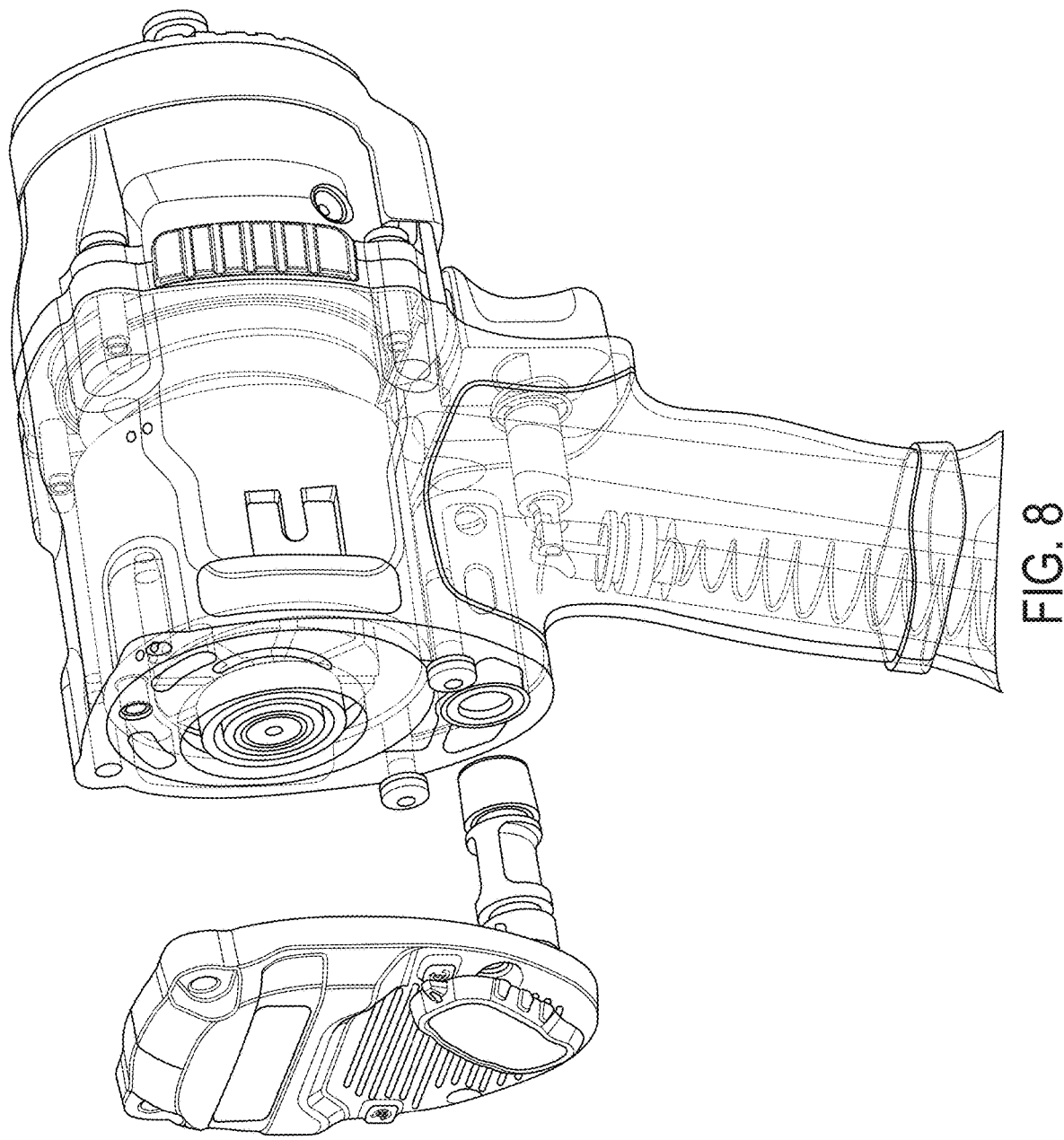
FIG. 8 illustrates a right perspective the back cap assembly and air inlet valve as shown in FIGS. 1-6 detached from the exemplary pneumatic-powered tool, in accordance with implementations described herein.
Figure 9:
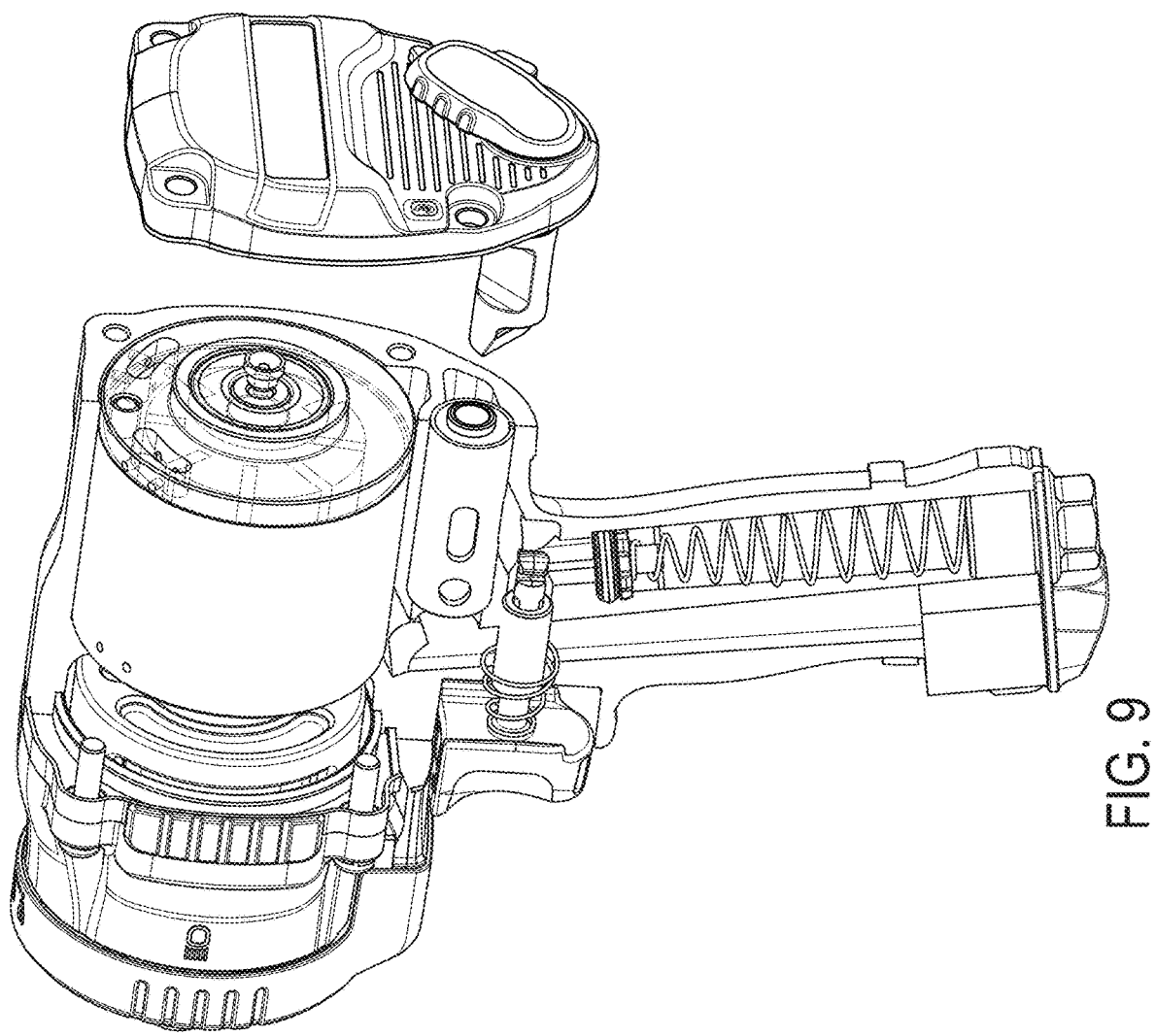
FIG. 9 illustrates a left perspective the back cap assembly and air inlet valve as shown in FIG. 8 detached from the exemplary pneumatic-powered tool, in accordance with implementations described herein.
Figure 10C:
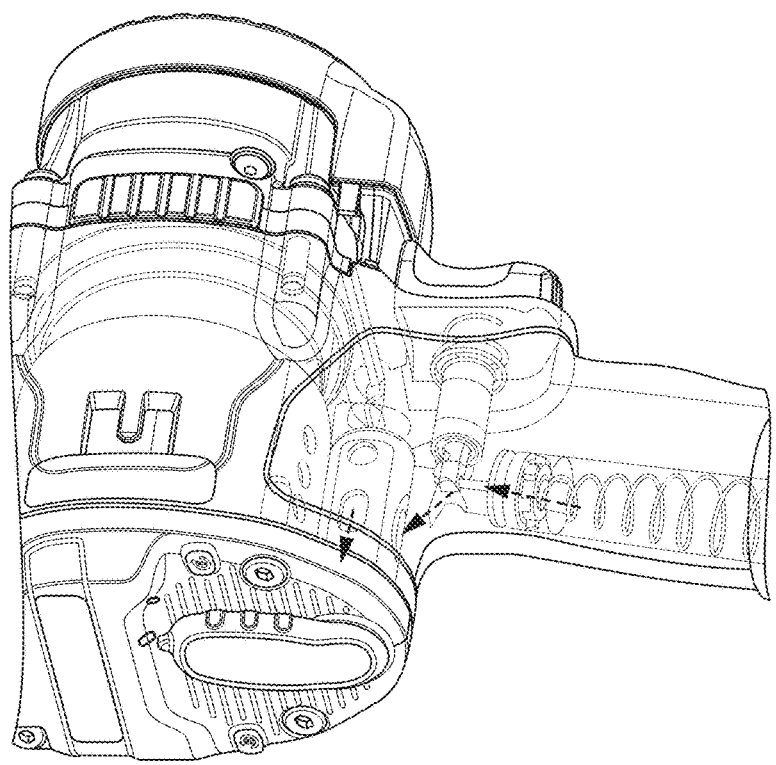
Figure 10B:
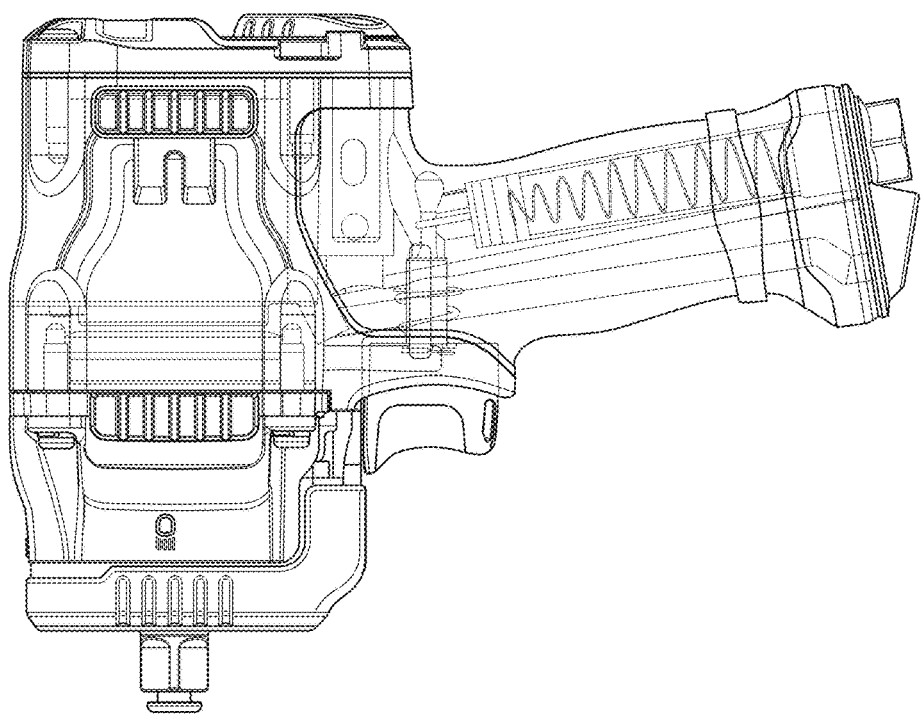
Figure 10D:
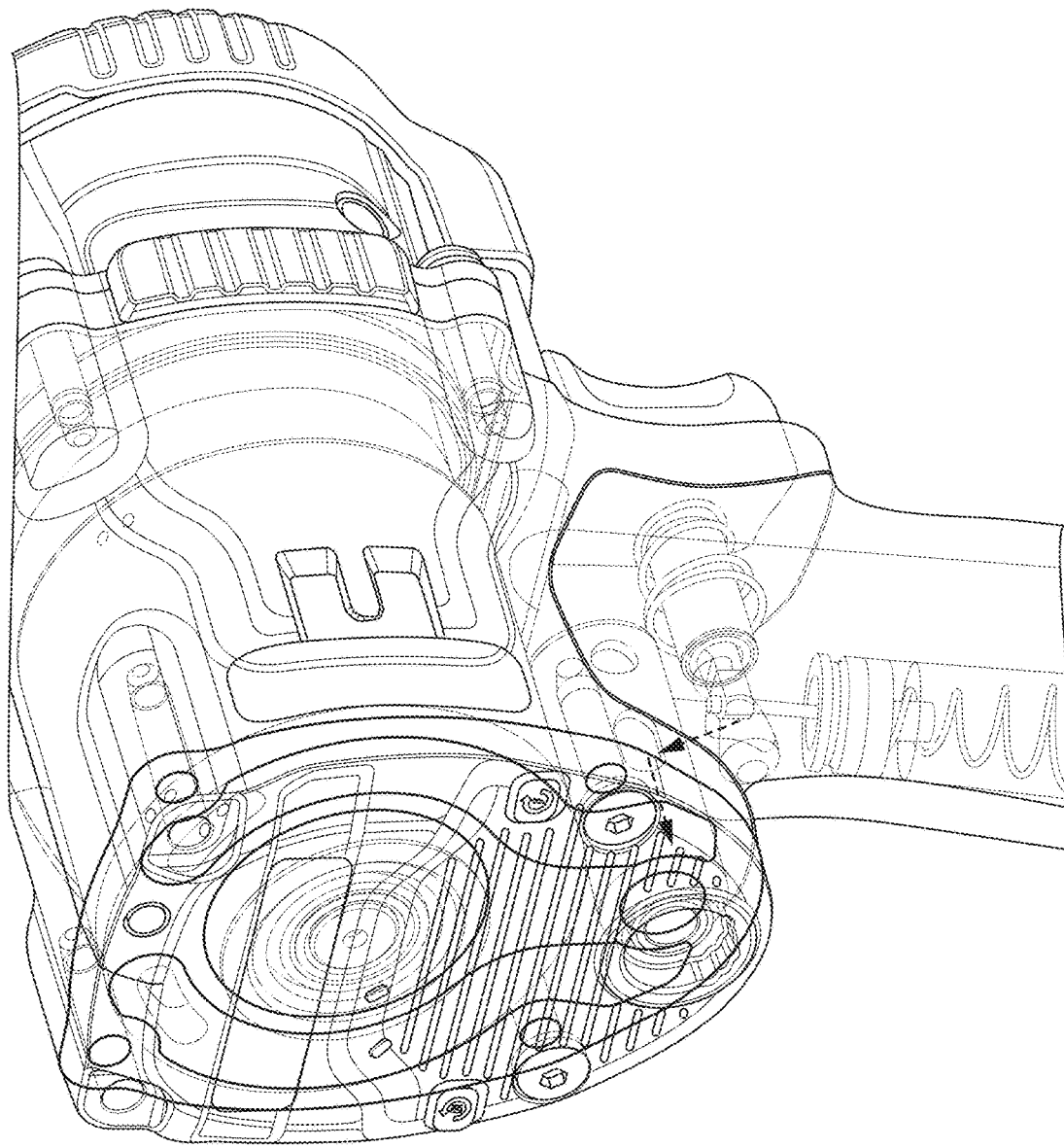
Figure 10F:
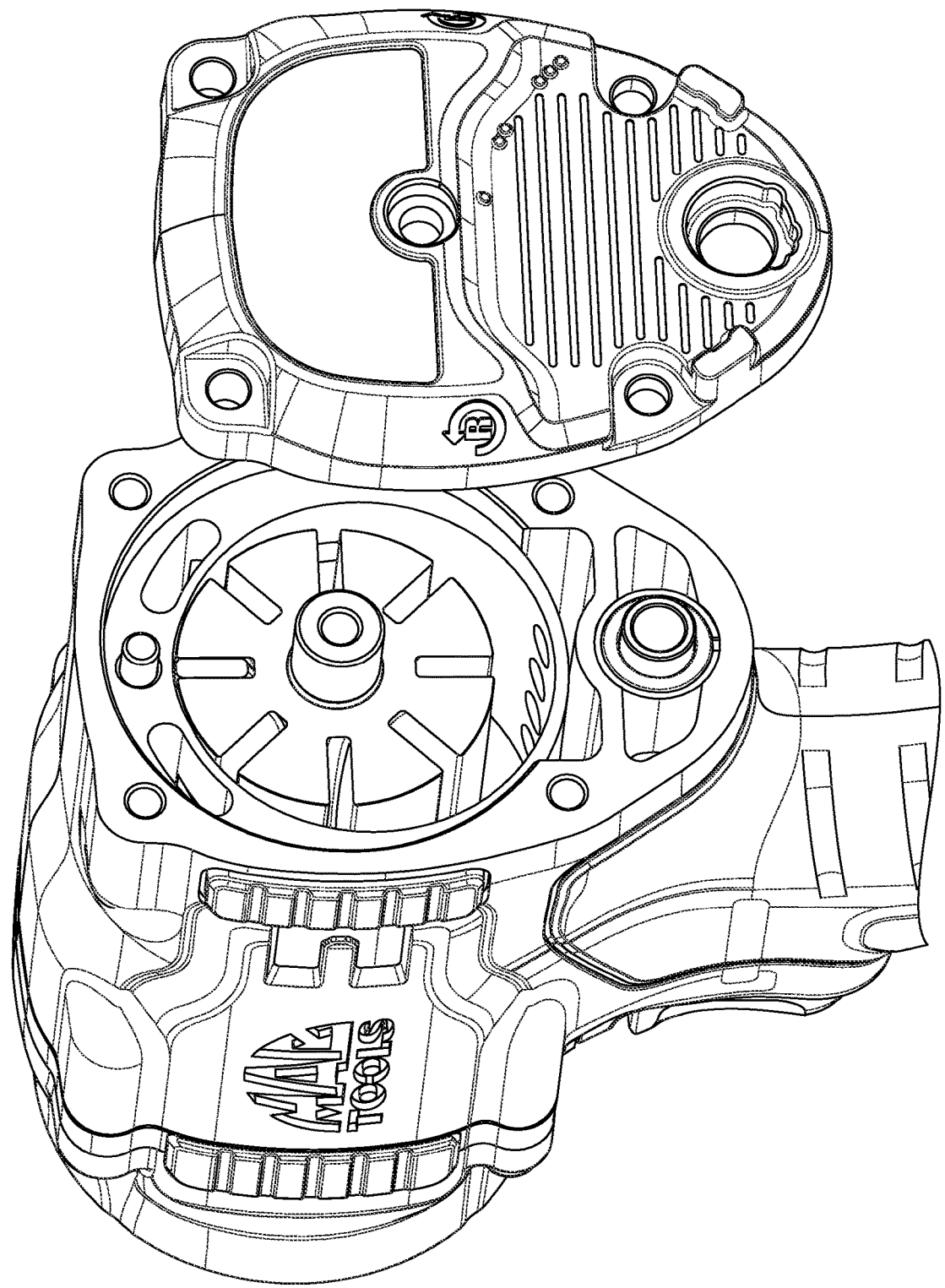
Figure 12:
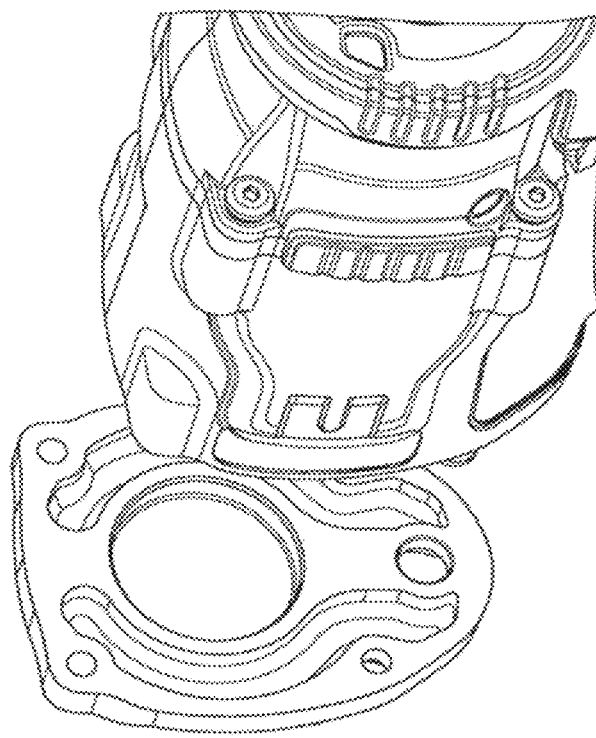
FIG. 12 illustrates a perspective of channels the back cap of the bidirectional air inlet valve assembly, in accordance with implementations described herein.
Figure 11:
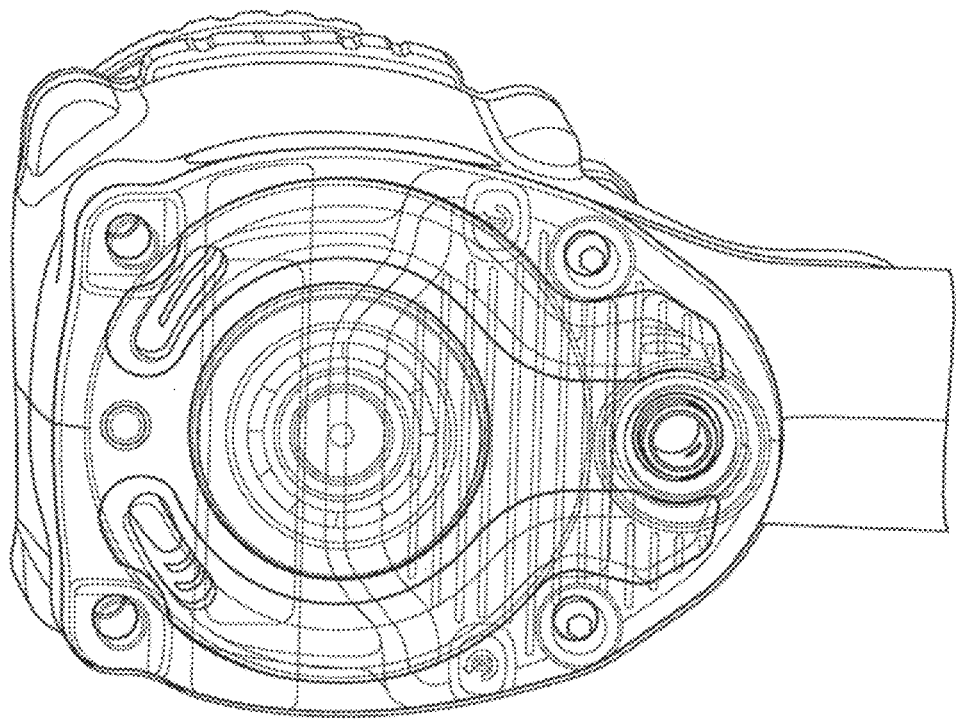
FIG. 11 illustrates a rear, interior view of the back cap assembly of the exemplary pneumatic-powered tool, in accordance with implementations described herein.
Figure 13:
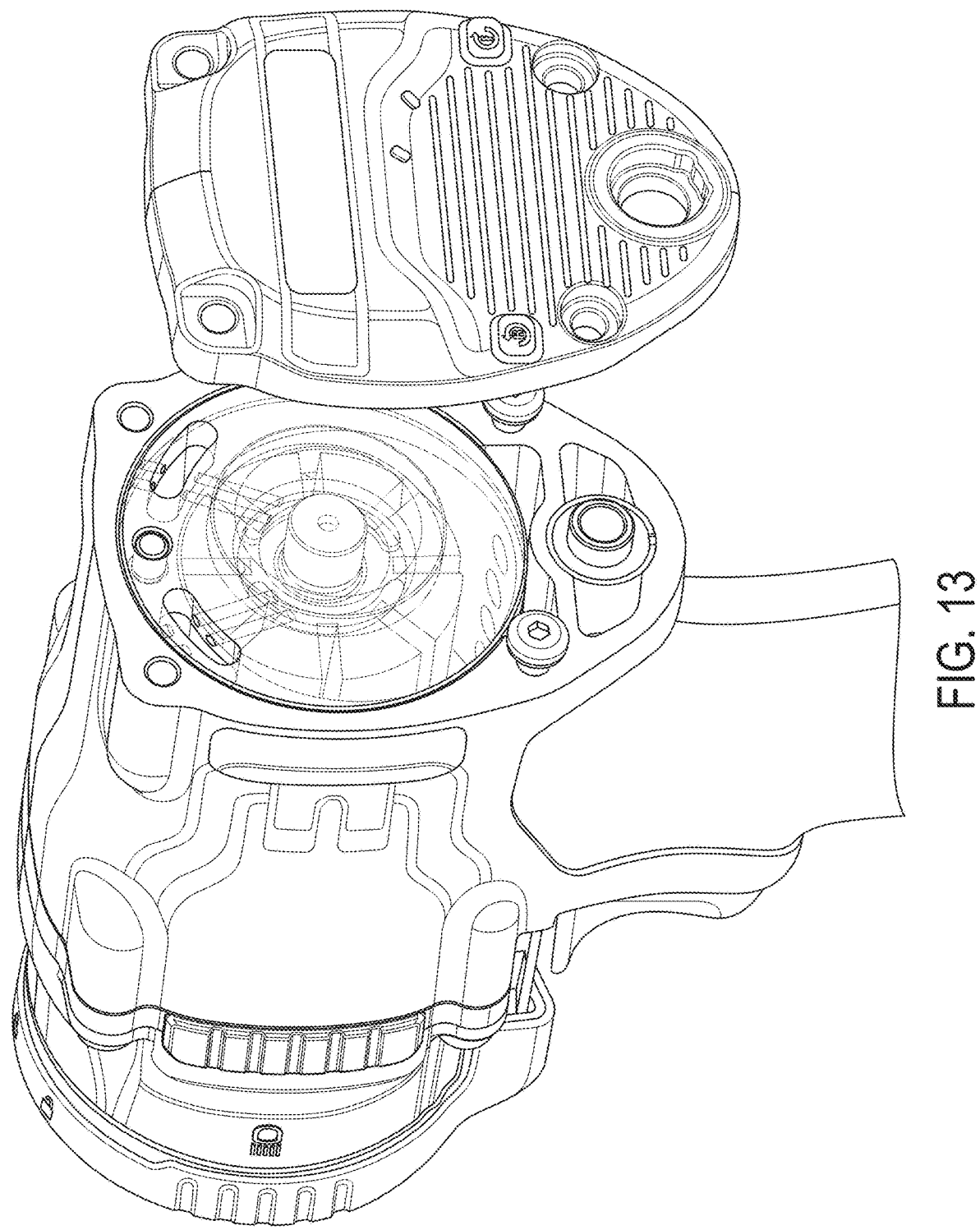
FIG. 13 illustrates a left, perspective view of the motor assembly and motor vanes of the exemplary bidirectional air inlet valve assembly, in accordance with implementations described herein.
Figure 14:
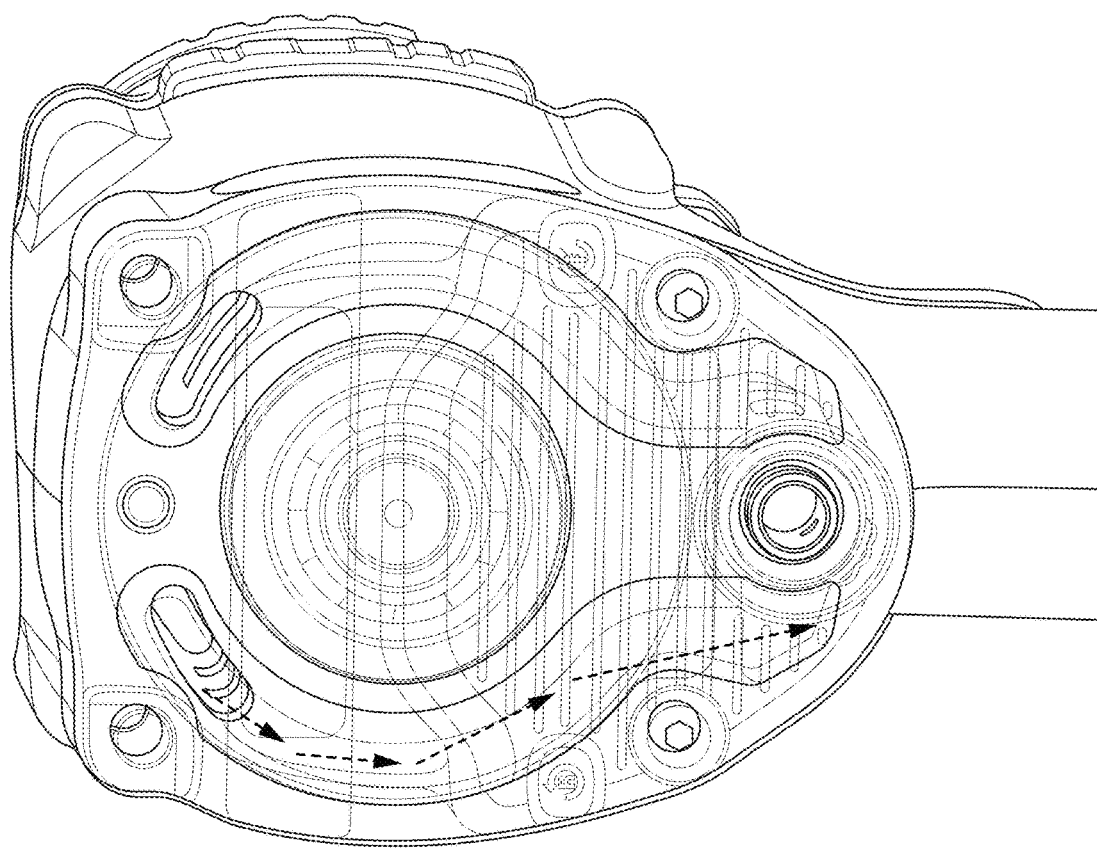
FIG. 14 illustrates a rear perspective view of the secondary exhaust air flow through the motor assembly back to the air inlet valve sleeve of the bidirectional air inlet valve assembly, in accordance with implementations described herein.
Figure 15:
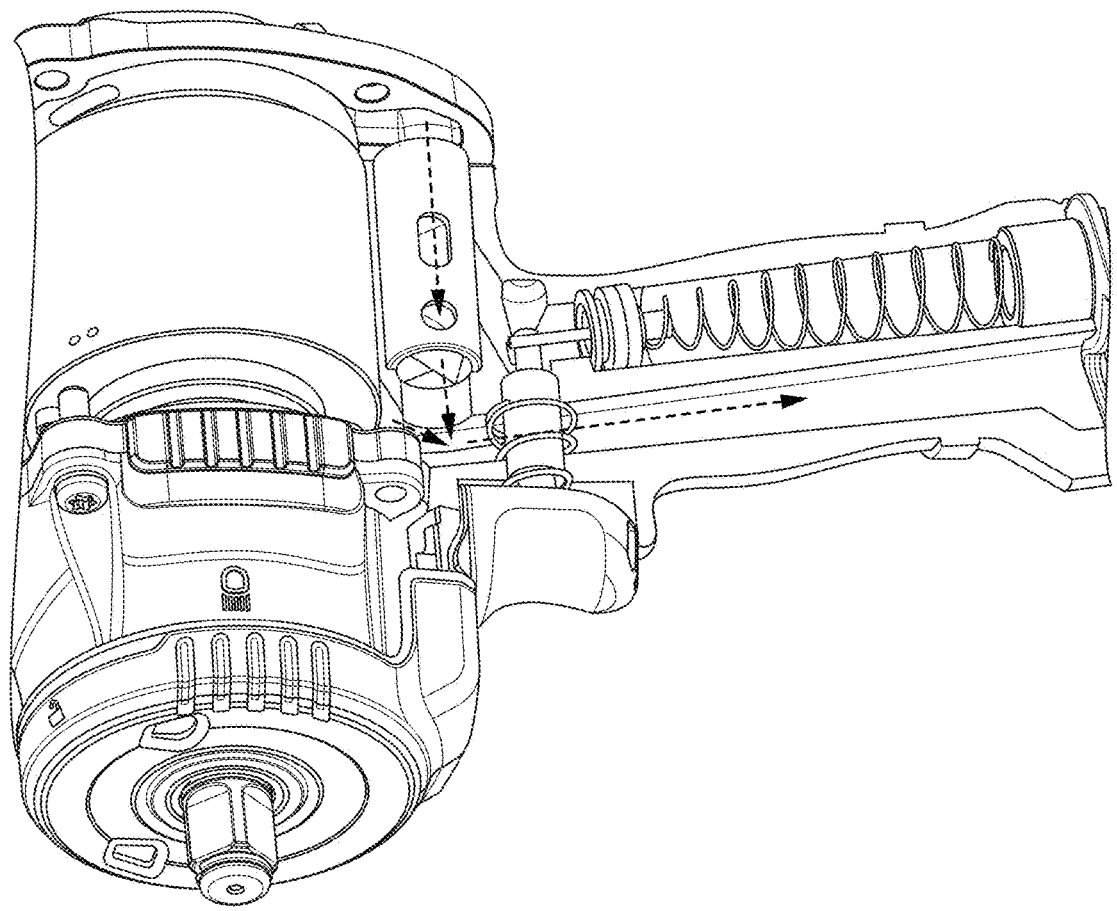
FIG. 15 illustrates a side perspective view of the secondary exhaust air flow through the air inlet valve sleeve and exiting the exemplary pneumatic-powered tool, in accordance with implementations described herein.

An example implementation of a bidirectional air inlet valve assembly is shown in FIGS. 1-16. The exemplary air inlet valve assembly 10 illustrated in FIGS. 1-16 is a bidirectional air inlet valve assembly, simply for ease of discussion and illustration. However, the principles to be described herein may be applied to other types of pneumatic tools that are operable in different modes such as, for example, a forward mode and a reverse mode.

As illustrated in the exemplary view shown in FIGS. 1-9, 10A-10F and 11-16, there is a bidirectional air inlet valve assembly 10 of an example tool 100 which may include a housing 120 including a handle portion 110. A rear housing cover 130 may enclose a rear end portion of the housing 120. A front housing cover 140 may enclose a front end portion of the housing 120. A switch 150 may be coupled to the rear housing cover 130. The switch 150 may be manipulatable by a user, allowing the user to select a mode of operation, such as, for example operation of the tool 100 in the forward mode and/or operation of the tool 100 in the reverse mode. A supply of power, for example, pneumatic power, or compressed air, to operate the tool 100 may be controlled through selective operation of a trigger 160 provided, for example, on a portion of the handle 110. A compressed air inlet 115 may be included, for example, at an end portion of the handle 110, to introduce compressed air, provided from an external source, into the tool 100. A discharge air outlet 170 may be included, for example, at an end portion of the handle 110, to discharge air from the tool 100. In some implementations, the tool 100 may operate in multiple modes, such as, for example, a forward mode and a reverse mode, based on a flow of compressed air through the tool 100 and a corresponding direction of a driving force provided by a drive system 200, or motor 200. A simplified, effective configuration for controlling the flow of air through the tool 100 in multiple directions, including, for example, a multi-directional valve, in accordance with implementations described herein, may enhance the efficiency and effectiveness, and overall performance of the tool 100.

The drive system 200 may include a rotor 210 rotatably installed in a rotor sleeve 220. A first rotor cap 230 may be coupled to a first end portion of the rotor sleeve 220, between the rotor sleeve 220 and the rear housing cover 130. A second rotor cap 240 may be coupled to a second end portion of the rotor sleeve 220, between the rotor sleeve 220 and the housing 120. The rotor sleeve 220, first rotor cap 230 and second rotor cap 240 may be fixed in the housing 120, and may define a chamber 260 in which the rotor 210 is received. A shaft 215 may define an axis of rotation of the rotor 210 in the chamber 260. A first end portion of the shaft 215 may be received in a shaft opening 235 defined in the first rotor cap 230, and a second end portion of the shaft 215 may be received in a shaft opening 245 defined in the second rotor cap 240. The rotor 210 may rotate within the chamber 260 defined by the rotor sleeve 220 and the first and second end caps 230, 240, based on a direction of compressed air flowing through the chamber 260.

For example, the rotor 210 may rotate in a first direction, for example, a forward direction corresponding to operation of the tool 100 in the forward mode, in response to compressed air introduced into the chamber 260 through a first air passage 231 defined in the first rotor cap 230. The rotor 210 may rotate in a second direction, for example, a reverse direction corresponding to operation of the tool 100 in the reverse mode, in response to compressed air introduced into the chamber 260 through a second air passage 232 defined in the first rotor cap 230. At least a portion of the compressed air (introduced into the chamber 260 through either the first air passage 231 or the second air passage 232) may be discharged from the chamber 260 through one or more primary discharge openings 225 defined in the rotor sleeve 220.

A valve assembly may selectively provide compressed air to the drive system 200, or motor 200. In some implementations, the valve assembly may include a valve 300 rotatably coupled in a stationary valve sleeve 400. The valve 300 may be coupled to the switch 150, for example, through the rear housing cover 130. The valve sleeve 400 may be fixed in the housing 120, while allowing the valve 300 to move, for example, rotate, within the valve sleeve 400. The valve 300 may rotate in response to manipulation of the switch 150, to direct a flow of compressed air to the first air passage 231, or to the second air passage 232, and into the chamber 260. For example, the valve 300 may rotate together with the switch 150, as the switch 150 is moved between a first position 150A (corresponding to operation of the tool 100 in a first mode) and a second position 150B (corresponding to operation of the tool 100 in a second mode). Rotation of the switch 150 and the corresponding rotation of the valve 300 in this manner may selectively guide compressed air into the chamber 260 through the first air passage 231 to rotate the rotor 210 in the first direction (for example, the forward direction corresponding to operation of the tool 100 in the forward mode) when the switch 150 and the valve 300 are positioned in the first position 150A. Rotation of the switch 150 and corresponding rotation of the valve 300 in this manner may also selectively guide compressed air into the chamber 260 through the second air passage 232 to rotate the rotor 210 in the second direction (for example, the reverse direction corresponding to operation of the tool 100 in the reverse mode) when the switch 150 and the valve 300 are positioned in the second position 150B. Hereinafter, simply for ease of discussion and illustration, the first position 150A of the switch 150 will correspond to operation of the tool 100 in the forward mode, and the second position 150B of the switch 150 will correspond to operation of the tool 100 in the reverse mode.

The valve 300 may include a valve body 310 having a proximal end portion coupled to the switch 150. Air inlet guide surfaces 320, for example, a first air inlet guide surface 320A and a second air inlet guide surface 320B, may be formed at opposite sides of an intermediate portion of the valve body 310. Each of the first and second air inlet guide surfaces 320A and 320B may include a substantially flat, transverse surface defining a cut out area of the valve body 310. An air discharge guide surface 330 may be formed at a distal end portion of the valve body 310. The air discharge guide surface 330 may be defined by an angled surface, or chamfer, at the distal end portion of the valve body 310.

The valve sleeve 400 may include a sleeve body 410 configured to surround the valve body 310 when the valve 300 is received in the valve sleeve 400. A main air inlet slot 450 may be formed in the sleeve body 410, for example, at a bottom portion of the sleeve body 410 to guide compressed air, from an external compressed air source, from the compressed air inlet 115 into the valve 300 coupled in the valve sleeve 400. Air inlet guide slots 420, for example, a first air inlet guide slot 420A and a second air inlet guide slot 420B, may be formed at opposite sides of an intermediate portion of the sleeve body 410. A position of the air inlet guide slots 420 on the sleeve body 410 may correspond to a position of the air inlet guide surfaces 320 on the valve body 310 when the valve 300 is coupled in the valve sleeve 400. Air discharge guide openings 430, for example, a first air discharge guide opening 430A and a second air discharge guide opening 430B, may be formed at an end portion of the sleeve body 410. A position of the air discharge guide openings 430 on the sleeve body 410 may correspond to a position of the air discharge guide surface 330 on the valve body 310 when the valve 300 is coupled in the valve sleeve 400.

The air inlet guide slots 420 have an elongated oval shape, and the air discharge guide openings 430 have a circular shape. However, the air inlet guide slots 420 and/or the air discharge guide openings 430 may have other shapes/contours. In some implementations, an area of the air inlet guide slots 420 may be greater than an area of the air discharge guide openings 430, allowing for more air to be introduced into the air flow path to rotate the motor 200. For example, in some implementations, an area of each of the air inlet guide slots 420 may be greater than or equal to approximately 50 mm$^2$ and an area of each of the air discharge guide openings 430 may be less than or equal to approximately 30 mm$^2$. This is just one example of sizing of the air inlet guide slots 420 and air discharge guide openings 430. Other sizes and/or combinations of sizes may be applied to the air inlet guide slots 420 and/or air discharge guide openings 430, depending on, for example, a flow rate of compressed air through a particular tool, a power setting for a particular mode of operation, a size of a particular tool, and other such factors.

In the rear housing cover 140, with switch 150 (and valve 300), a first air channel 133 and a second air channel 134 may be formed within the rear housing cover 130. The first air channel 133 may extend between a first air inlet 131 and a first air outlet 135 in the rear housing cover 130. The second air channel 134 may extend between a second air inlet 132 and a second air outlet 136 in the rear housing cover 130. In an assembled arrangement, a position of the first air outlet 135 of the rear housing cover 130 may correspond to a position of the first air passage 231 of the first rotor cap 230/chamber 260, and a position of the second air outlet 136 of the rear housing cover 130 may correspond to a position of the second air passage 232 of the first rotor cap 230/chamber 260.

As noted above, the valve sleeve 400 may remain in a fixed position in the tool housing 120, while the valve 300 rotates within the valve sleeve 400. The valve sleeve 400 is illustrated in the FIGs to more clearly illustrate the positioning of the air inlet guide surfaces 320 and the air discharge guide surface 330 of the valve 300 relative to the positioning of the air inlet guide slots 420 and the air discharge guide openings 430 of the valve sleeve 400 during operation of the tool 100 in the forward mode. Similarly, the valve sleeve 400 is illustrated outside of the tool housing 120 in the FIGs to more clearly illustrate the positioning of the air inlet control surfaces 320 and the air discharge guide surface 330 of the valve 300 relative to the positioning of the air inlet guide slots 420 and the air discharge openings 430 of the valve sleeve 400 during operation of the tool in the reverse mode.

When operating in the forward mode, the switch 150 is rotated to the first position 150A, and the valve 300 is also rotated (while the valve sleeve 400 remains stationary). In this arrangement, the second air inlet guide slot 420B and the first air discharge guide opening 430A are blocked by corresponding portions of the valve body 310, while the second air discharge guide opening 430B is open due to the chamfered surface of the air discharge guide surface 330. Compressed air may be introduced into the tool 100 from an external source through, for example, the compressed air inlet 115 provided in the handle 110. From the compressed air inlet 115, compressed air flows into the valve 300 through the main air inlet slot 450 in the valve sleeve 400. In this arrangement, the first air inlet guide surface 320A of the valve 300 is positioned at an angle that guides the compressed air out through the first air inlet guide slot 420A and into the first air channel 133 through the first air inlet 131. The compressed air travels out of the first air channel 133 through the first air outlet 135, and into the chamber 260 through the first air passage 231. The compressed air introduced into the chamber 260 through the first air passage 231 causes the rotor 210 to rotate in the first direction, as illustrated by the arrow F3. Rotation of the rotor 210 in the first direction may cause the tool 100 to operate in the forward mode, corresponding to the first position 150A of the switch 150 and corresponding position of the valve 300.

As the rotor 210 rotates in the first direction, in response to the continued introduction of compressed air into the chamber 260 through the first air passage 231 a portion of the compressed air is discharged out of the chamber 260 through the primary discharge openings 225 in the rotor sleeve 220, and into a primary discharge channel 270. Residual air, remaining in the chamber 260 beyond the primary discharge openings 225, may be drawn out of the chamber 260 through the second air passage 232.

In this example, when operating the in the forward mode, the second air passage 232 may function as a secondary discharge opening 232 and the second air channel 134 may function as a secondary discharge channel 134. For example, when operating in the forward mode, the residual air may be drawn from the chamber 260, through the second air inlet 232, or secondary discharge opening 232, and the second air channel 134, or secondary discharge channel 134, and into the valve 300. The residual air may be guided out of the valve 300 and into the primary discharge channel 270 by the air discharge guide surface 330 and the open second air discharge guide opening 430B. From the primary discharge channel 270, both the primary discharge air, and the residual discharge air, may be discharged from the tool 100, for example, through the primary discharge channel 270 extending through the handle 110 of the tool 100, and out through a discharge air port 170, or other arrangement based on the physical configuration of a particular tool.

When operating in the reverse mode, the switch 150 is rotated to the second position 150B, and the valve 300 is also rotated (while the valve sleeve 400 remains stationary). In this arrangement, the first air inlet guide slot 420A and the second air discharge guide opening 430B are blocked by corresponding portions of the valve body 310, while the first air discharge guide opening 430A is open due to the chamfered surface of the air discharge guide surface 330. Compressed air flows into the valve 300 through the main air inlet 450 of the sleeve 400, where the second air inlet guide surface 320B of the valve 300 is positioned at an angle that guides the compressed air out through the second air inlet guide slot 420B and into the second air channel 134 through the second air inlet 132. The compressed air travels out of the second air channel 134 through the second air outlet 136, and into the chamber 260 through the second air passage 232. The compressed air introduced into the chamber 260 through the second air passage 232 rotates the rotor 210 in the second direction, to operate the tool 100 in the reverse mode.

As the rotor 210 rotates in the second direction, in response to the continued introduction of compressed air into the chamber 260 through the second air passage 232, a portion of the compressed air is discharged out of the chamber 260 through the primary discharge openings 225 in the rotor sleeve 220, and into the primary discharge channel 270. Residual air, remaining in the chamber 260 beyond the primary discharge openings 225, may be drawn out of the chamber 260 through the first air passage 231.

When operating the in the reverse mode, the first air passage 231 may function as a secondary discharge opening 231, and the first air channel 133 may function as a secondary discharge channel 133. For example, when operating in the reverse mode, the residual air may be drawn from the chamber 260, through the first air inlet 231, or secondary discharge opening 231, and the first air channel 133, or secondary discharge channel 133, and into the valve sleeve 400, then into the valve 300. The residual air may be guided out of the valve 300 and into the primary discharge channel 270 by the air discharge guide surface 330 and the open first air discharge guide opening 430A. From the primary discharge channel 270, both the primary discharge air, and the residual discharge air, may be discharged from the tool 100 as described above.

In some implementations, the tool 100 may be operated at different speeds in a certain mode. For example, in some implementations, the tool 100 may be capable of operation at a plurality of different speeds in the forward mode. This may be achieved by, for example, controlling an amount of compressed air, and/or a flow rate of compressed air, through the valve 300 and into the chamber 260 to rotate the motor 200. For example, a highest flow rate/highest speed may be achieved when the valve 300 is in a fully open position, in which the main air inlet slot 450 is fully open and not obstructed by a portion of the valve body 310. In some implementations, this may be achieved by, for example, a rotation of the valve 300 all the way to the first position 150A of the switch 150. In some implementations, this may reflect a rotation of approximately 45 degrees from the neutral position 150C. Intermediate speeds, for example, between this highest speed and the neutral position setting may be achieved by, for example, partial rotation of the valve 300, in which portions of the valve body 310 may partially obstruct flow of air through the main air inlet slot 450.

In a pneumatic-powered tool, in accordance with implementations described herein, compressed air may follow a first flow path through the tool to rotate the motor in the first (for example, forward) direction and operate the tool in the first (for example, forward) mode. Compressed air may follow a second flow path through the tool to rotate the motor in the second (for example, reverse) direction and operate the tool in the second (for example, reverse) mode. The compressed air flowing into the tool may be directed along the first flow path, or along the second flow path, based on a position of a valve relative to a valve sleeve controlling the direction of incoming compressed air. In particular, incoming compressed air may be directed along the first flow path or along the second flow path, based on positions of a plurality of air inlet guide surfaces of the valve relative to a corresponding plurality of air inlet guide slots of the valve sleeve. Air may be discharged from a chamber in which the motor rotates along a primary discharge path, and along a secondary discharge path, for discharge from the tool through a primary discharge channel. During operation in the first mode, as air flows along the first flow path, a portion of the second flow path may serve as the secondary discharge path. During operation in the second mode, as air flows along the second flow path, a portion of the first flow path may serve as the secondary discharge path.

A valve rotatably coupled in a valve sleeve, in accordance with implementations as described herein, may include first and second air inlet guide surfaces that direct incoming air through a corresponding first or second air inlet guide slot formed in the valve sleeve, depending on a position of the valve relative to the valve sleeve. The first and second air inlet guide surfaces may include substantially flat transverse surfaces defining cut out areas at an intermediate portion of the valve. The valve may also include an air discharge guide surface, including a chamfered surface formed at a distal end portion of the valve. The air discharge guide surface may be selectively aligned with a first or second air discharge opening in the valve sleeve, to direct secondary discharge air into a primary discharge channel for discharge from the tool.

In a pneumatic-powered tool, in accordance with implementations described herein, the flat, transverse air inlet guide surfaces of the valve may be relatively easily aligned with the air inlet guide slots formed in the valve sleeve. This may provide for a relatively simple, reliable and efficient way to direct air flow through the tool in a desired direction, using a valve and a valve sleeve configuration that are relatively simple to manufacture and assemble, enhancing performance and reliability of the tool.

Air Flow Path

FIGS. 10A-10F illustrate a forward air flow path and a secondary exhaust air flow path of the bidirectional air inlet valve assembly through an exemplary pneumatic-powered tool, in accordance with implementations described herein. In this embodiment of the present invention, and in this illustration the tool in a Forward operating mode, air is flowing through inlet channel of the handle into the tool. The air leaves the from inlet channel and travels through the primary inlet hole of the value sleeve. In this embodiment, the valve sleeve is preferred to have at two holes on each side adapted to receive air flow. On each side of the valve sleeve the two holes may be horizontally placed adjacent to one another but may also be vertically or diagonally placed. Further, the two holes on each side are generally parallel and across one the other two holes in the valve sleeve.

The air then passes through the first oval hole on the right side of the valve sleeve into the right side of the housing's main side channel where the valve is contained within. In this example, there is a second hole substantially adjacent to the first oval hole configured for air flow but is blocked by end of the air inlet valve.

At that point the air coming from the primary hole of the valve sleeves and now into the right side of the housing's main side channel, the air now travels up from the housing main side channel up into the motor sleeve where there are two half circles (but can be more) at the top and to the right of the motor sleeve. The air is the routed from the top and to the right of the motor sleeve onto the motor. The air may be pushed onto motor vanes that are movably contained within slots of the motor. The motor vanes may be plastic, metal, wood, or any suitable material configured to move the motor in rotation for the forward mode. In this embodiment, the motor vanes are v-shaped sleeves adapted for moving air flow but can be any shaped suitable for directing air flow through a tool. The motor vanes are configured separate thin boards that are configured to slide in and out of the motor. The rotation in this embodiment is in a clockwise rotation (the reverse is in a counter-clockwise rotation) but can be in any rotatable direction as suitable to drive the motor. The vanes may be any shape configured to receive the air and move the motor in rotation.

As the motor and motor vanes turn in the clockwise rotation, most of the air is removed from motor and channeled out through a plurality of holes in the motor sleeve and down into a side of the housing's main side channels.

In this example, the remaining air left among the motor in the motor sleeve is removed through a secondary exhaust channel path through to the two holes at top and to the left of the motor sleeve and flows through a hole at the top left of the motor end cap, down through at least one channel in the main tool end cap and to at least one side of housing's main channels to the exhaust channel in the handle.

In this instance, the second hole is open to allow removal of air from the motor sleeve, but the first primary hole b is blocked by the valve. The end of the valve is angled to block the second hole a in the valve sleeve when air is passing through the first primary hole of one side of the valve sleeve but to allow air passage of the second hole b of the opposite side.

The example and alternative embodiments described above may be combined in a variety of ways with each other. It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. Furthermore, the steps and number of the various steps illustrated in the figures may be adjusted from that shown. The accompanying figures and attachments illustrate exemplary embodiments of the invention.

Although the present invention has been described in terms of particular example and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the example and alternative embodiments described above can be configured without departing from the scope and spirit of the invention. Therefore, it is to be understood that, within the scope of the appended claims, the invention may be practiced other than as specifically described herein.

What is claimed is:

1. A bidirectional air inlet valve assembly, comprising:
an inlet valve, where in the air inlet vale sleeve has an angled surface to control air flow;
an inlet valve sleeve, wherein the inlet valve has a plurality of different size apertures configured for directing air flow, and wherein the inlet valve sleeve includes;
a main inlet slot defined in a bottom portion of the valve sleeve;
a first inlet guide slot defined in a first side of the valve sleeve;
a second inlet guide slot defined in a second side of the valve sleeve;
a first discharge guide opening defined in the first side of the valve sleeve; and
a second discharge guide opening defined in the second side of the valve sleeve; and
a back cap, wherein the back cap has a plurality of air inlet ports adapted to receive air flow;
a valve rotatably received in the valve sleeve, the valve including:
a valve body;
a first inlet guide surface defined in a first side of the valve body;
a second inlet guide surface defined in a second side of the valve body; and
a discharge guide surface defined by a chamfer at a distal end portion of the valve body; and
a motor sleeve, wherein in the motor sleeve has a plurality of motor inlet ports configured to receive air flow, and wherein in the motor sleeve has a plurality of exhaust channel adapt to control air flow.

2. A method of improving air flow in a tool, comprising:
controlling air through an inlet valve, wherein the inlet valve is adapted to allow air flow based on position of the inlet valve;
directing air through an inlet valve sleeve, wherein the air is directed through a plurality of apertures in the inlet valve sleeve;
directing air into a motor, where in the motor includes a plurality of vanes configured for turning in a direction;
channeling air through a plurality of apertures in a motor sleeve surrounding the motor;
a back cap, wherein the back cap is configured to move air flow in connection with the motor and to an exhaust channel of the inlet valve; and
when applicable, directing remaining air in the motor through a second exhaust channel back to the inlet valve.

* * * * *